US011238885B2

(12) United States Patent
Mittal et al.

(10) Patent No.: US 11,238,885 B2
(45) Date of Patent: Feb. 1, 2022

(54) COMPUTING SYSTEM FOR EXPRESSIVE THREE-DIMENSIONAL FACIAL ANIMATION

(71) Applicant: Microsoft Technology Licensing, LLC, Redmond, WA (US)

(72) Inventors: Gaurav Mittal, Pittsburgh, PA (US); Baoyuan Wang, Sammamish, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 143 days.

(21) Appl. No.: 16/173,491

(22) Filed: Oct. 29, 2018

(65) Prior Publication Data

US 2020/0135226 A1    Apr. 30, 2020

(51) Int. Cl.
  *G10L 21/10*    (2013.01)
  *G06N 3/04*    (2006.01)
  *G06T 13/40*    (2011.01)

(52) U.S. Cl.
  CPC ........... *G10L 21/10* (2013.01); *G06N 3/04* (2013.01); *G06T 13/40* (2013.01); *G10L 2021/105* (2013.01)

(58) Field of Classification Search
  CPC ... G06T 13/40; G10L 21/10; G10L 2021/105; G06N 3/04

(Continued)

(56) References Cited

U.S. PATENT DOCUMENTS

| 9,786,084 | B1 * | 10/2017 | Bhat | ............ G06T 7/11 |
| 2010/0082345 | A1 * | 4/2010 | Wang | ........... G06T 13/205 |
| | | | | 704/260 |

(Continued)

FOREIGN PATENT DOCUMENTS

WO    2017137947 A1    8/2017

OTHER PUBLICATIONS

Pham, et al., "Speech-driven 3D facial animation with implicit emotional awareness: A deep learning approach", In Proceedings of the IEEE Conference on Computer Vision and Pattern Recognition Workshops, Jul. 21, 2017, pp. 80-88.

(Continued)

*Primary Examiner* — Michael Colucci
(74) *Attorney, Agent, or Firm* — Medley, Behrens & Lewis, LLC

(57) ABSTRACT

A computer-implemented technique for animating a visual representation of a face based on spoken words of a speaker is described herein. A computing device receives an audio sequence comprising content features reflective of spoken words uttered by a speaker. The computing device generates latent content variables and latent style variables based upon the audio sequence. The latent content variables are used to synchronized movement of lips on the visual representation to the spoken words uttered by the speaker. The latent style variables are derived from an expected appearance of facial features of the speaker as the speaker utters the spoken words and are used to synchronize movement of full facial features of the visual representation to the spoken words uttered by the speaker. The computing device causes the visual representation of the face to be animated on a display based upon the latent content variables and the latent style variables.

20 Claims, 14 Drawing Sheets

(58) Field of Classification Search
USPC .......................................................... 704/235
See application file for complete search history.

(56) References Cited

U.S. PATENT DOCUMENTS

| | | | | |
|---|---|---|---|---|
| 2010/0141663 | A1* | 6/2010 | Becker | G06T 13/80 345/473 |
| 2012/0130717 | A1* | 5/2012 | Xu | H04L 51/10 704/258 |
| 2013/0130779 | A1* | 5/2013 | Gagner | G07F 17/3267 463/25 |
| 2013/0242031 | A1* | 9/2013 | Petterson | G06K 9/00228 348/14.07 |
| 2015/0287403 | A1* | 10/2015 | Holzer Zaslansky | G10L 21/10 704/231 |
| 2017/0178287 | A1* | 6/2017 | Anderson | G06K 9/00228 |
| 2018/0374242 | A1* | 12/2018 | Li | G06T 15/04 |
| 2019/0130628 | A1* | 5/2019 | Cao | G06K 9/00228 |

OTHER PUBLICATIONS

Ding, et al., "Exprgan: Facial expression editing with controllable expression intensity", In Proceedings of the Thirty-Second AAAI Conference on Artificial Intelligence, Feb. 2, 2018, pp. 6781-6788.
Goodfellow, et al., "Generative adversarial nets", In Proceedings of Annual Conference on Neural Information Processing Systems, Dec. 8, 2014, pp. 1-9.
Hannun, et al., "Deep speech: Scaling up end-to-end speech recognition", In Journal of Computing Resaearch Repository, Dec. 2014, pp. 1-12.
Higgins, et al., "beta-vae: Learning basic visual concepts with a constrained variational framework", Retrieved From: https://openreview.net/references/pdf?id=Sy2fzU9gl, Nov. 4, 2016, pp. 1-13.
Hsu, Wei-Ning, "Unsupervised learning of disentangled and interpretable representations from sequential data", In Proceedings of Annual Conference on Neural Information Processing Systems, Dec. 4, 2017, pp. 1-12.
Huang, et al., "Dyadgan: Generating facial expressions in dyadic interactions", In Proceedings of IEEE Conference on Computer Vision and Pattern Recognition, Jul. 21, 2017, pp. 11-18.
Jalalifar, et al., "Speech-driven facial reenactment using conditional generative adversarial networks", In Journal of Computing Research Repository, Mar. 20, 2018, pp. 1-12.
Karras, et al., "Audio-driven facial animation by joint end-to-end learning of pose and emotion", In Proceedings of ACM Transactions on Graphics, vol. 36, No. 4, Jul. 2017, 12 Pages.
Kim, et al., "Deep video portraits", In Proceedings of ACM Transactions on Graphics, vol. 37, No. 1, May 2018, 14 Pages.
Kim, et al., "On Learning Associations of Faces and Voices", In Journal of Computing Research Repository, Aug. 2018, pp. 1-26.
Nojavanasghari, et al., "Interactive Generative Adversarial Networks for Facial Expression Generation in Dyadic Interactions", In Journal of Computing Research Repository, Jan. 2018, 10 Pages.
Olszewski, et al.,, "Realistic Dynamic Facial Textures from a Single Image using GANs", In Proceedings of IEEE International Conference on Computer Vision, Oct. 22, 2017, 10 Pages.
Qiao, et al., "Geometry-contrastive generative adversarial network for facial expression synthesis", In Journal of Computing Research Repository, Feb. 2018, 7 Pages.
Song, et al., "Geometry guided adversarial facial expression synthesis", In Journal of Computing Research Repository, Dec. 2017, 14 Pages.
Song, et al., "Talking Face Generation by Conditional Recurrent Adversarial Network", In Journal of Computing Research Repository, Apr. 2018, pp. 1-19.
Suwajanakorn, et al., "Synthesizing obama: learning lip sync from audio", In Journal of ACM Transactions on Graphics, vol. 36, No. 4, Jul. 2017, 13 Pages.
Taylor, et al., "A deep learning approach for generalized speech animation", In Journal of ACM Transactions on Graphics, vol. 36, No. 4, Jul. 2017, 16 Pages.
Thies, et al., "Face2face: Real-time face capture and reenactment of RGB videos.", In Proceedings of the IEEE Conference on Computer Vision and Pattern Recognition, Jun. 27, 2016, 9 Pages.
Vougioukas, et al., "End-To-End Speech-Driven Facial Animation with Temporal Gans", In Journal of Computing Research Repository, May 2018, pp. 1-14.
"International Search Report and Written Opinion Issued in PCT Application No. PCT/US2019/057504", dated Feb. 13, 2020, 14 Pages.

* cited by examiner

COMPUTING SYSTEM FOR EXPRESSIVE THREE-DIMENSIONAL FACIAL ANIMATION

BACKGROUND

Facial animation is an area of computer graphics that concerns generating and animating an image of a representation of a face. Facial animation has applications in virtual reality technology, gaming technology, and multi-lingual dubbing.

Facial expressions are important in properly conveying an underlying meaning, tone, and/or emotions of spoken words uttered by a speaker. Thus, correctly animating facial features such as eyes, eyebrows, a nose, etc. is important in generating realistic facial animations. Hence, in addition to syncing mouth and lip movements of a visual representation of a face to spoken words uttered by the speaker, it is desirable that other facial features on the visual representation are properly animated in order to properly reflect a mood/emotion of the speaker.

Conventional computer-implemented techniques for facial animation suffer from various deficiencies. First, many conventional techniques tend to require motion capture of a face of a speaker that utters spoken words. This requires a video capture device, which may be undesirable in certain scenarios (e.g., scenarios in which privacy is a concern, scenarios in which there are spatial constraints that prevent deployment of a motion capture device, etc.). Second, even if motion capture is not required, conventional techniques tend to focus on movement of a mouth and lips of the speaker at the exclusion of other facial features of the speaker. This can lead to unnatural facial animations that do not appear authentic. Third, conventional audio-based facial animation techniques tend to use a purely supervised learning approach. Supervised learning approaches tend to lead to an averaging effect that occurs due to multiple ways of moving a mouth and lip region of a face in correlation with a speech sound. The averaging effect prevents effective generalization of conventional audio-based facial animation approaches over diverse groups of speakers that vary in age, gender, and/or ethnicity. Additionally, the averaging effect may result in a many-to-many function when trends from multiple speakers are incorporated, which is undesirable.

SUMMARY

Described herein are various technologies pertaining to facial animation. With more specificity, a computer-implemented technique for animating a visual representation of a face based upon spoken words uttered by a speaker is described herein. The technique realizes a hierarchy in the spoken words by decoupling content representation of the spoken words from style representation of the spoken words. The technique further enforces lateral disentanglement of the style representation into identity factors (e.g., an age of the speaker, a gender of the speaker, an ethnicity of the speaker, etc.) and emotion/mood factors.

In operation, a computing device receives an audio sequence comprising content features reflective of spoken words uttered by a speaker. The computing device generates latent content variables based upon the content features of the audio sequence, wherein the latent content variables are to be used by the computing device (or another computing device) to synchronize movement of lips on a visual representation of a face to the spoken words uttered by the speaker in the audio sequence. The visual representation of the face may be a depiction of a face of the speaker.

The computing device also generates latent style variables based upon the audio sequence. The latent style variables are derived from an expected appearance of facial features of the speaker as the speaker utters the spoken words. Moreover, the latent style variables are to be used by the computing device (or another computing device) to synchronize movement of full facial features of the visual representation of the face to the spoken words uttered by the speaker. The latent style variables may be influenced by at least one of an age of the speaker, a gender of the speaker, an ethnicity of the speaker, or one or more emotions of the speaker as the speaker utters the spoken words.

The computing device may segment the visual representation of the face into segments, wherein each segment in the segments is assigned to a different facial feature of the visual representation of the face. In a non-limiting example, the segments may comprise a first segment assigned to eyes of the visual representation, a second segment assigned to a nose of the visual representation, a third segment assigned to a mouth of the visual representation, and a fourth segment assigned to features of the visual representation other than the eyes, the nose, and the mouth.

The computing device (or another computing device) then causes the visual representation of the face to be animated on a display (which may be part of the computing device or another computing device) based upon the latent content variables and the latent style variables. Additionally, the computing device may animate the visual representation based upon the segments. The computing device may play the audio sequence on a speaker concurrently with animation of the visual representation of the face such that movements of the visual representation of the face are synchronized with the spoken words of the audio sequence.

The above-described technologies present various advantages over conventional computer-implemented techniques for facial animation. First, as described above, the above-described technologies can animate a visual representation of a face based on an audio sequence of spoken words uttered by a speaker without resorting to motion-capture techniques. Second, by treating emotional awareness explicitly in the latent style variables (as opposed to implicitly) and decoupling style from content, the above-described technologies capture a mood of the speaker more accurately than conventional techniques and thus generate a more realistic animation. Third, the above-described technologies alleviate the averaging effect described above through use of semi-supervised learning methods and hence generalize well over speakers of varying ages, genders, and/or ethnicities. Fourth, by segmenting the visual representation of the face into segments and basing the animation in part upon the segments, the above-described technologies reduce an amount of blur during animation and lower complexity of the animation process without impacting generalization.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
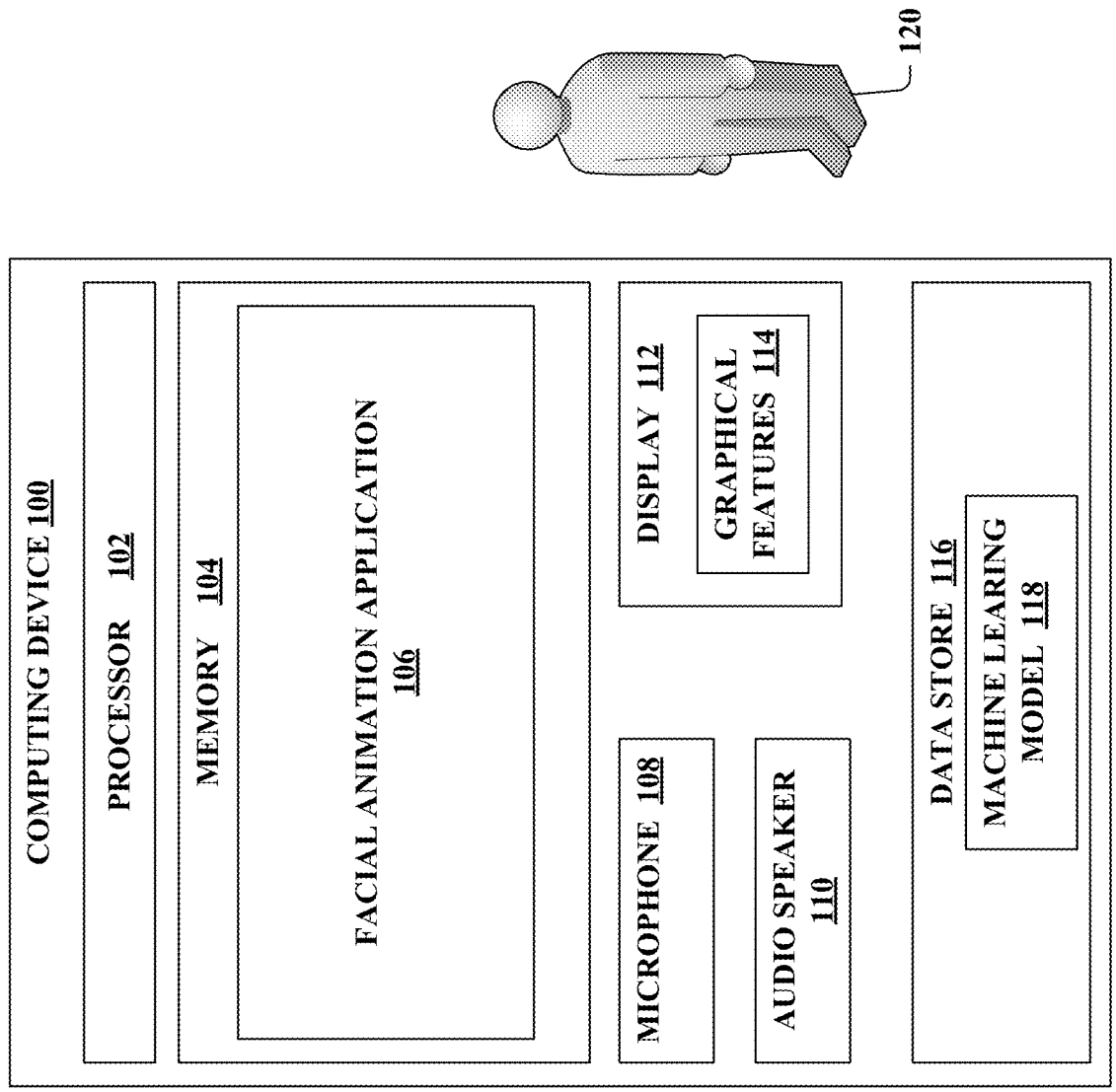
FIG. 1 illustrates a functional block diagram of an exemplary computing device for animating a visual representation of a face.

Various technologies pertaining to animating a visual representation of a face based upon an audio sequence uttered by a speaker are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Referring now to the drawings, FIG. 1 illustrates a computing device 100 that is configured to animate a visual representation of a face. In an embodiment, the computing device 100 may be a desktop computing device, a laptop computing device, a tablet computing device, a smartphone, or a video game console. The computing device 100 is in the presence of a (human) speaker 120. For instance, the computing device 100 may be operated by the speaker 120.

The computing device 100 comprises at least one processor 102 and memory 104. The at least one processor 102 is configured to execute instructions loaded into the memory 104. The memory 104 comprises a computer-executable facial animation application 106. As will be described in greater detail below, the facial animation application 106 is configured to animate a visual representation of a face based upon spoken words uttered by the speaker 120. The memory 104 may also comprise additional computer-executable applications (not shown) that execute alongside the facial animation application 106. Although the facial animation application 106 is depicted as being a stand-alone application, it is to be understood that functionality of the facial animation application 106 may be incorporated into the additional applications (not shown) loaded in the memory 104. For instance, functionality of the facial animation application 106 may be incorporated into a video game application loaded in the memory 104.

The computing device 100 comprises a microphone 108 that is configured to receive spoken words and sounds uttered by the speaker 120. Although the microphone 108 is depicted as being part of the computing device 100, it is to be understood that the microphone 108 may be a separate component that is in wired or wireless communication with the computing device 100.

The computing device 100 may comprise an audio speaker 110 that is configured to emit audible sounds. In an example, the audio speaker 110 may emit audible sounds reflective of spoken words uttered by the speaker 120 that are received by the computing device 100 by way of the microphone 108. Although the audio speaker 110 is depicted as being part of the computing device 100, it is to be understood that the audio speaker 110 may be a separate component that is in wired or wireless communication with the computing device 100. Additionally, although the computing device 100 is depicted as comprising a single audio speaker, it is to be understood that the computing device 100 may comprise many audio speakers.

The computing device 100 further comprises a display 112, whereupon graphical features 114 may be presented thereon. For instance, the graphical features 114 may include an animation of a visual representation of a face. In an embodiment, the visual representation of the face is a depiction of a face of the speaker 120. In another embodiment, the visual representation of the face is an avatar of the speaker 120.

The computing device 100 comprises a data store 116. The data store 116 may comprise a computer-implemented machine learning model 118. As will be described in greater detail below, the machine learning model 118 is configured to facilitate animation of a visual representation of a face based upon spoken words of the speaker 120. In an embodiment, the machine learning model 118 may be a recurrent neural network (RNN) comprising a plurality of long short-term memory (LSTM) units. In another embodiment, the machine learning model 118 may be or include a generative adversarial network (GAN) (or a conditional GAN) comprising a plurality of LSTM units. In yet another embodiment, the machine learning model 118 may be or include a variational autoencoder (VAE) comprising a plurality of LSTM units.

In an example, the machine learning model 118 may comprise nodes and edges that couple nodes in the machine learning model 118. For instance, the machine learning model 118 may be an artificial neural network (ANN), a Bayesian model, a deep neural network (DNN), or the like. In another example, the machine learning model 118 may be or include a support vector machine (SVM), a naïve Bayes classifier, or other suitable classifier. When the machine learning model 118 comprises nodes and edges, each edge is assigned a learned weight, wherein the weight can be learned using a supervised, semi-supervised, or unsupervised learning procedure. Accordingly, for instance, a weight assigned to an edge can be influenced by content of an audio sequence and a style of an audio sequence (e.g., influenced by an age of the speaker 120, a gender of the speaker 120, an ethnicity of the speaker 120, a mood/emotion of the speaker 120, etc.). The facial animation application 106 may provide an audio sequence to the machine learning model 118 as input, and the machine learning model 118 may generate a plurality of frames as output based upon the input and the weights assigned to the edges, wherein each frame in the plurality of frame depicts a state of the visual representation of the face at a sequential point in time, wherein each frame reflects an expected appearance of a face of the speaker 120 as the speaker 120 utters spoken words of the audio sequence.

While the data store 116 has been described as retaining a single machine learning model, it is to be understood that the data store 116 may retain many different machine learning models.

In operation, the microphone 108 receives an audio sequence that is uttered by the speaker 120. The audio sequence comprises content features reflective of spoken words uttered by the speaker 120. In a non-limiting example, the spoken words may be "put red at G9 now." The content features are reflective of a finite number of changing phonetic sounds (phonemes) throughout the audio sequence. The phonemes are associated with visual counterparts (visemes).

The facial animation application 106 generates latent content variables based upon the content features of the audio sequence. The latent content variables are to be used by the facial animation application 106 to synchronize movement of lips on a visual representation of a face (that will be presented on the display 112) to the spoken words uttered by the speaker 120. More specifically, the facial animation application 106 utilizes the machine learning model 118 to generate the latent content variables by providing the audio sequence as input to the machine learning model 118.

The facial animation application 106 also generates latent style variables based upon the audio sequence. More specifically, the facial animation application 106 utilizes the machine learning model 118 to generate the latent style variables by providing the audio sequence as input to the machine learning model 118 (described in greater detail below). The latent style variables are to be used by the facial animation application 106 to synchronize movement of full facial features of the visual representation of the face (i.e., facial features beyond a mouth and lips, such as eyes, eyebrows, a nose, etc.) to the spoken words uttered by the speaker 120. The latent style variables are derived from an expected appearance of facial features of the speaker 120 as the speaker 120 utters the spoken words.

The latent style variables may be influenced by an age of the speaker 120, a gender of the speaker 120, an ethnicity of the speaker 120, and/or one or more emotions of the speaker 120 as the speaker 120 utters the spoken words. For instance, emotions of the speaker 120 may include happiness, sadness, anger, disgust, fear, and neutral. Moreover, the emotions of the speaker 120 may have different "levels," such as low, medium, high, and unspecified. In an example, latent style variables for an audio sequence uttered by a woman for the sentence "The weather will be awful today" will differ from latent style variables for the same sentence uttered by a man. The latent style variables may correlate with a fundamental frequency (F0) and volume of the audio sequence. Unlike the latent content variables, the latent style variables capture full facial features of the speaker 120 (as opposed to solely mouth and lip movement as with the latent content variables).

In an embodiment, the facial animation application 106 may segment the visual representation of the face into segments. Each segment in the segments is assigned to a different facial feature of the visual representation of the face. In a non-limiting example, the segments may comprise a first segment assigned to eyes of the visual representation, a second segment assigned to a nose of the visual representation, a third segment assigned to a mouth of the visual representation, and a fourth segment assigned to features of the visual representation other than the eyes, the nose, and the mouth.

The facial animation application 106 then animates the visual representation of the face on the display 112 based upon the latent content variables and the latent style variables. The facial animation application 106 may also animate the visual representation of the face based upon the segments (in addition to the latent content variables and the latent style variables). The facial animation application 106 may employ conditional generative adversarial networks (GAN) to drive an animation process after segmenting the visual representation of the face. The facial animation application 106 may generate a preliminary template for each segment in the plurality of segments. The facial animation application 106 may combine each preliminary template for each segment to generate a frame which may be displayed in the animation. The facial animation application 106 may repeat this process to generate a plurality of frames based upon the latent content variables, the latent style variables, and (optionally) the segments. Each frame depicts a state of the visual representation at a sequential point in time. The facial animation application 106 then causes each frame in the plurality of frames to be presented sequentially on the display 112.

The facial animation application 106 may also cause the audio sequence (that was received by the computing device 100 via the microphone 108) to be played on the audio speaker 110 concurrently with animating the visual representation of the face such that movements of the visual representation of the face are synchronized with the spoken words of the audio sequence. Thus, movements of the lips and mouth of the visual representation reflect the movements of the lips and mouth of the speaker 120. Additionally, movements of other facial features of the visual representation also reflect movement of other facial features of the speaker 120.

Figure 2:
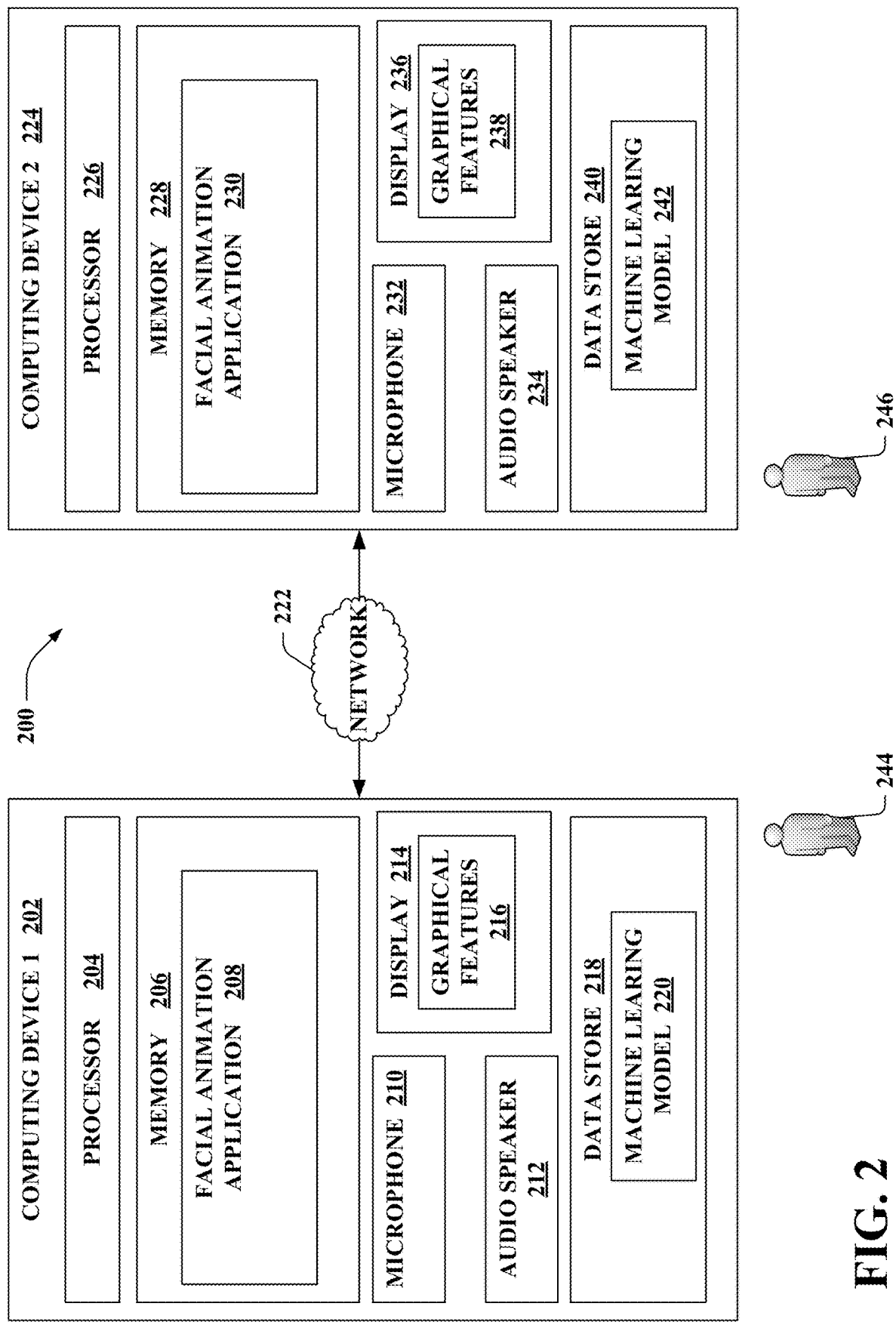
FIG. 2 illustrates a functional block diagram of an exemplary computing system for animating a visual representation of a face.

Turning now to FIG. 2, a computing system 200 that facilitates animating a visual representation of a face is illustrated. The computing system 200 includes a first computing device 202. The first computing device 202 is in the presence of and/or operated by a first (human) speaker 244. In a non-limiting example, the first computing device 202 may be a desktop computing device, a laptop computing device, a tablet computing device, a smartphone, or a video game console.

The first computing device 202 comprises at least one processor 204 and memory 206, wherein the memory 206 has a facial animation application 208 loaded therein. The facial animation application 208 (when executed by the at least one processor 204) is configured to facilitate animation of a visual representation of a face based upon spoken words uttered by a speaker. In an embodiment, the facial animation application 208 can be or include a video gaming application.

The first computing device 202 includes a microphone 210, an audio speaker 212, and a display 214 similar to the microphone 108, the audio speaker 110, and the display 112 of the computing device 100 described in FIG. 1. Graphical features 216 may be presented on the display 214.

The first computing device 202 may include a data store 218 that comprises a computer-implemented machine learning model 220. The machine learning model 220 may be similar or identical to the machine learning model 118 described above in the description of FIG. 1

The computing system 200 additionally includes a second computing device 224 that is in communication with the first computing device 202 by way of a network 222 (e.g., the Internet, intranet, etc.). The second computing device 224 is in the presence of and/or operated by a second (human) speaker 246. In a non-limiting example, the second computing device 224 may be a desktop computing device, a laptop computing device, a tablet computing device, a smartphone, or a video game console The second computing device 224 comprises at least one processor 226 and memory 228, wherein the memory 228 has a facial animation application 230 loaded therein. The facial animation application 230 (when executed by the processor 226) is configured to facilitate animation of a visual representation of a face based upon spoken words uttered by a speaker.

The second computing device 224 includes a microphone 232, an audio speaker 234, and a display 236 similar to the microphone 108, the audio speaker 110, and the display 112 of the computing device 100 described in FIG. 1. Graphical features 238 may be presented on the display 236.

The second computing device 224 may include a data store 240 that comprises a computer-implemented machine learning model 242. The machine learning model 242 may be similar or identical to the machine learning model 118 described above in the description of FIG. 1.

Operation of the computing system 200 is now set forth. The first computing device 202 receives the audio sequence uttered by the first speaker 244 via the microphone 210. In a first embodiment, the facial animation application 208 of the first computing device 202 generates the latent content variables and the latent style variables as described above in the description of FIG. 1. The facial animation application 208 may also segment the visual representation of the face as described above in the description of FIG. 1. The first computing device 202 then transmits data (e.g., the audio sequence, the latent content variables, the latent style variables, the segments, etc.) to the second computing device 224, causing the second computing device 224 to animate a visual representation of a face on the display 236. For instance, the visual representation of the face may be a representation of the first speaker 244. The data may also cause the audio sequence to be played on the audio speaker 234 of the second computing device 224 concurrently with causing the visual representation of the face to be animated such that movements of the visual representation of the face are synchronized with the spoken words of the audio sequence (as played by the speaker 234).

In a second embodiment, the first computing device 202 transmits the audio sequence to the second computing device 224. In the second embodiment, the facial animation application 230 of the second computing device 224 generates the latent content variables and the latent style variables as described above. The facial animation application 230 may also segment the visual representation of the face as described above. The facial animation application 230 then animates the visual representation of the face on the display 236 based upon the latent content variables and the latent style variables. The facial animation application 230 may also animate the visual representation of the face based upon the segments (in addition to the latent content variables and the latent style variables). The facial animation application 230 may also cause the audio sequence to be played on the audio speaker 234 concurrently with animating the visual representation of the face such that movements of the visual representation of the face are synchronized with the spoken words of the audio sequence.

It is to be appreciated that roles of the first speaker 244 and the second speaker 246 may be reversed. For instance, the second computing device 244 may receive a second audio sequence uttered by the second speaker 246 by way of the microphone 232 of the second computing device 224. The facial animation application 208 of the first computing device 202 or the facial animation application 230 of the second computing device 224 may then generate second latent content variables, second latent style variables, and second segments based upon the second audio sequence similar to the process described above. The facial animation application 208 may then animate the visual representation of the face on the display 214 based upon the second latent content variables and the second latent style variables. The facial animation application 208 may also animate the visual representation of the face based upon the second segments (in addition to the latent content variables and the latent style variables). The facial animation application 208 may also cause the audio sequence to be played on the audio speaker 212 concurrently with animating the visual representation of the face such that movements of the visual representation of the face are synchronized with the spoken words of the audio sequence.

Figure 3:
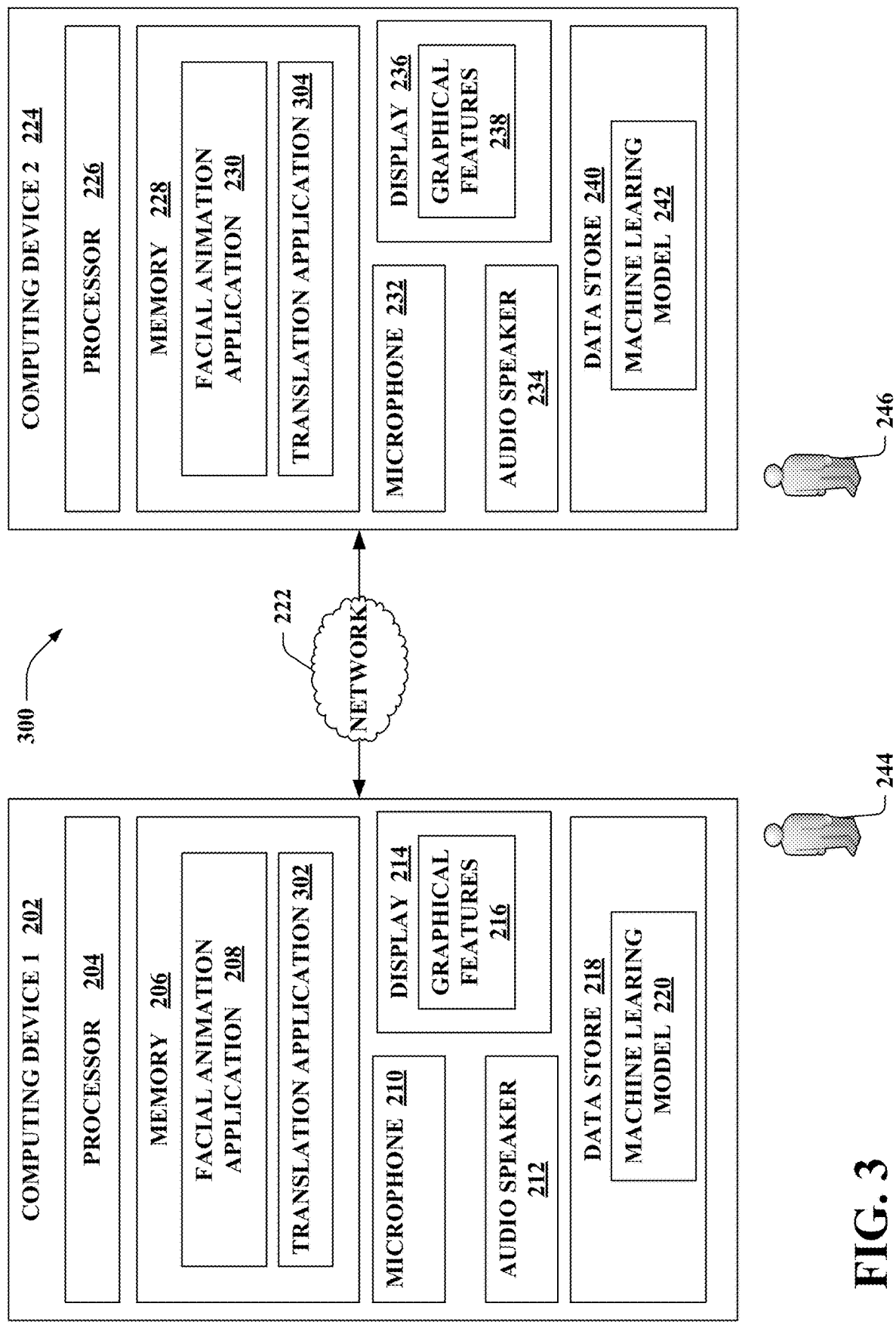
FIG. 3 illustrates a functional block diagram of an exemplary computing system for animating a visual representation of a face.

With reference now to FIG. 3, a computing system 300 that facilitates animating a visual representation of a face is illustrated. The computing system 300 comprises the first computing device 202 that is in communication with the second computing device 224 by way of the network 222; however, in the computing system 300, the first computing device 202 includes a translation application 302 loaded in the memory 302 and the second computing device 224 includes a translation application 304 loaded in the memory 228. The facial animation application 208, the translation application 302, the facial animation application 230, and the translation application 304 are configured to work in conjunction with one another to translate an audio sequence uttered by the first speaker 244 and animate a visual representation of a face based upon the translated audio sequence.

Operation of the computing system 300 is now set forth. The first computing device 202 receives an audio sequence uttered by the first speaker 244 in a first language by way of the microphone 210. The audio sequence comprises content features reflective of spoken words uttered by the first speaker 244 in the first language.

In a first embodiment, the translation application 302 translates the audio sequence from the first language to a second language, thereby generating a translated audio sequence. The translated audio sequence comprises translated content features reflective of translated spoken words. In a second embodiment, the first computing device 202 transmits the audio sequence to the second computing device 224, wherein the translation application 304 generates the translated audio sequence. The facial animation application 208 and/or the facial animation application 230 generate translated latent content variables based upon the translated content features. The translated latent content variables are to be used by the facial animation application 208 and/or the facial animation application 230 to synchronize movement of lips on a visual representation of a face to the translated audio sequence. The facial animation application 208 and/or the facial animation application 230 generate translated latent style variables based upon the audio sequence and the translated audio sequence. The translated latent style variables are to be used by the facial animation application 208 and/or the facial animation application 230 to synchronize movement of full facial features of the visual representation of the face to the translated audio sequence. The facial animation application 208 and/or the facial animation application 230 also segment the visual representation of the face into segments, wherein each segment is assigned to a different facial feature of the visual representation of the face. In the first embodiment, the facial animation application 208 then transmits data (e.g., the translated audio sequence, the translated latent content variables, the translated latent style variables, the segments, etc.) to the facial animation application 230 causing the facial animation application 230 to animate the visual representation of the face on the display 236 based upon the translated latent content variables, the translated latent style variables, and the segments. In the second embodiment, the facial animation application 230 animates the visual representation of the face on the display 236 based upon the translated latent content variables, the translated latent style variables, and the segments. The facial animation application 230 plays the translated audio sequence on the audio speaker 234 concurrently with animating the visual representation of the face such that movements of the visual representation of the face are synchronized with the translated audio sequence. Additionally, the movements of the visual representation of the face reflect a style of speaking of the first speaker 244.

It is to be appreciated that roles of the first speaker 244 and the second speaker 246 may be reversed. For instance, the second computing device 244 may receive a second audio sequence uttered by the second speaker 246 in the second language by way of the microphone 232 of the second computing device 224. The translation application 304 may translate the second audio sequence into the first language, thereby generating a second translated audio sequence. Similar to the example described above, the facial animation application 208 and/or the facial animation application 230 may work in conjunction with one another to generate second translated content variables, second translated latent style variables, and second segments based upon the second translated audio sequence. The facial animation application 208 may then animate a visual representation of a face on the display 214 based upon second translated latent content variables, second translated latent style variables, and the second segments. The facial animation application 208 plays the second translated audio sequence on the audio speaker 212 concurrently with animating the visual representation of the face such that movements of the visual representation of the face are synchronized with the second translated audio sequence.

Figure 4:
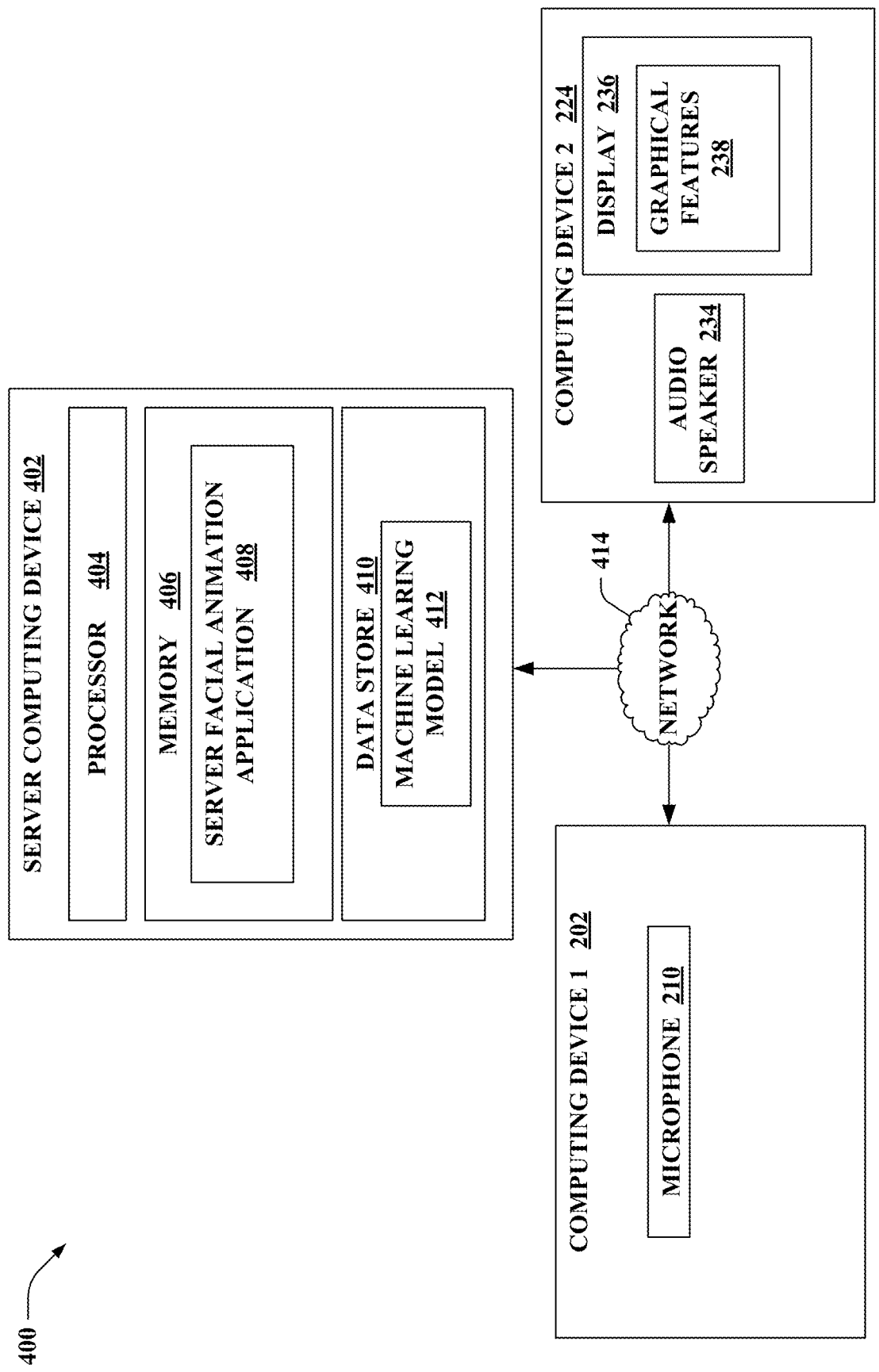
FIG. 4 illustrates a functional block diagram of an exemplary computing system for animating a visual representation of a face.

Referring now to FIG. 4, a computing system 400 that facilitates animating a visual representation of a face is illustrated. The computing system 400 includes a server computing device 402. The server computing device 402 comprises at least one processor 404 and memory 406. The memory 406 has a server facial animation application 408 loaded therein. In general, the server facial animation application 408 (when executed by the at least one processor 404) is configured to animate a visual representation of a face based upon spoken words uttered by a speaker.

The server computing device 402 additionally comprises a computer-implemented machine learning model 412. The machine learning model 412 may be identical or similar to the machine learning model 118 described above in the description of FIG. 1.

The computing system 400 includes the first computing device 202 and the second computing device 224 described above in the description of FIG. 2. The server computing device 402 is in communication with the first computing device 202 and the second computing device 224 by way of a network 414 (e.g., the Internet, intranet, etc.). While not shown in FIG. 3, it is to be appreciated that the first computing device 202 includes the processor 204, the memory 206, the facial animation application 208, the microphone 210, the audio speaker 212, the display 214 (and the graphical features 216). It is also to be appreciated that the second computing device 224 includes the processor 226, the memory 228, the facial animation application 230, the microphone 232, the speaker 234, the display 236 (and the graphical features 238). However, in the computing system 400, the first computing device 202 and the second computing device 224 may fail to include the machine learning model 220 and the machine learning model 242, respectively.

As such, the first computing device 202 receives the audio sequence uttered by the speaker 244 via the microphone 210. The first computing device 202 the transmits the audio sequence to the server computing device 402. Responsive to receiving the audio sequence, the server facial animation application 408 may generate the latent content variables and the latent style variables as described above. The server facial animation application 408 may also segment the visual representation into segments as described above. The server facial animation application 408 may then transmit data to the second computing device 224 causing the second computing device 224 to animate a visual representation of a face on the display 236. For instance, the visual representation of the face may be a representation of the speaker 244. The data may also cause the audio sequence to be played on the audio speaker 234 of the second computing device 224 concurrently with causing the visual representation of the face to be animated such that movements of the visual representation of the face are synchronized with the spoken words of the audio sequence (as played by the audio speaker 234).

Figure 5:
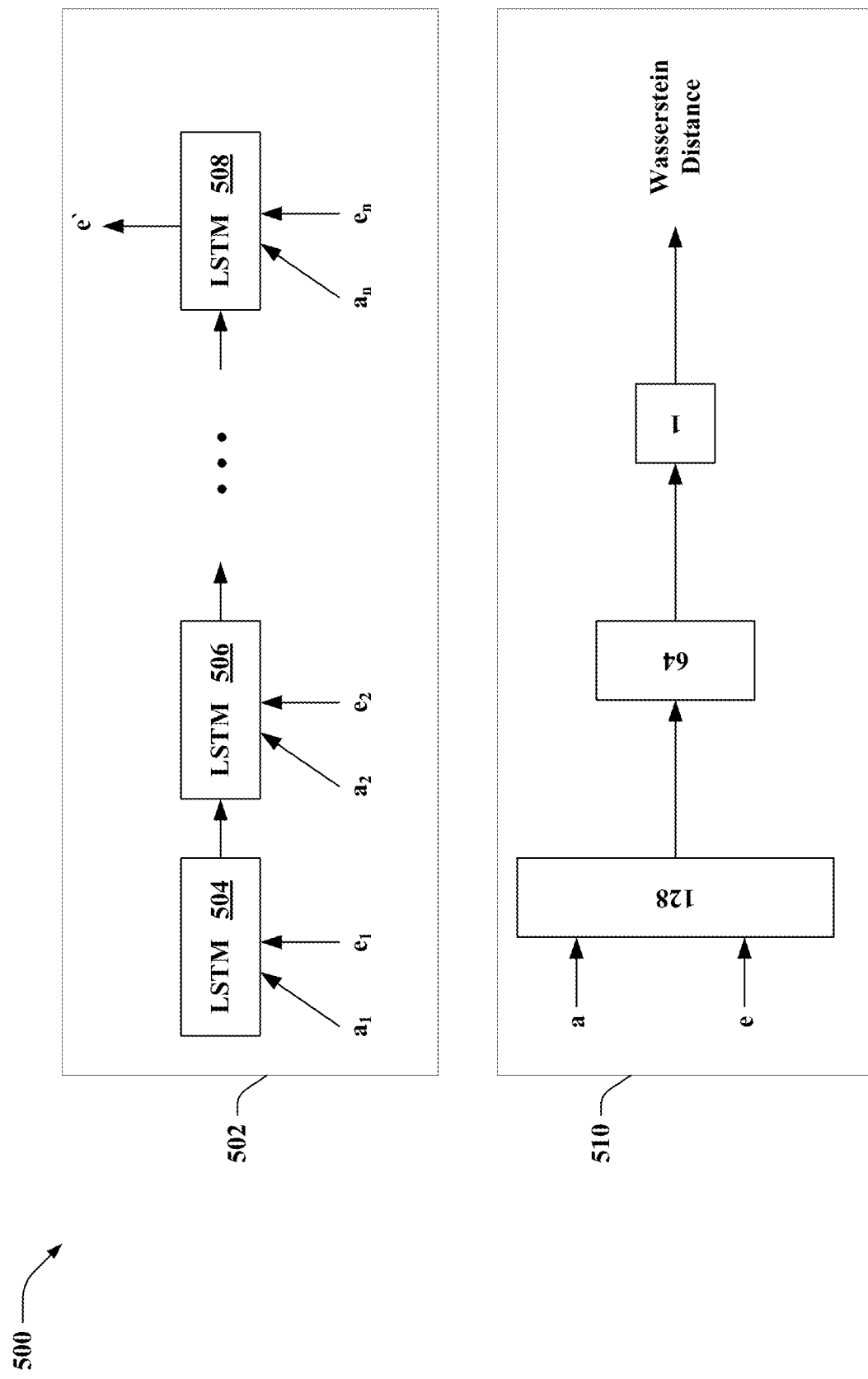
FIG. 5 is a depiction of an exemplary generative adversarial network (GAN).

With reference now to FIG. 5, an exemplary generative adversarial network (GAN) 500 is depicted. In an example, the GAN 500 can be or include the machine learning model 118, the machine learning model 220, the machine learning model 242, and/or the machine learning model 412. In another example, the machine learning model 118, the machine learning model 220, the machine learning model 242, and/or the machine learning model 412 can be or include the GAN 500.

The GAN 500 comprises a generator 502 and a discriminator 510. In general, the generator 502 is configured to generate facial features (specifically, mouth and lip facial features) corresponding to an audio sequence. The generator 502 comprises a plurality of long short-term memory (LSTM) units 504-508. The inputs to the generator 502 are audio sequences $(a_1 \ldots a_n)$ having a duration of time, features from a neutral face $(e_i \ldots e_n)$, and random gaussian noise vectors (not shown). The output of the generator 502 is a set of facial features e' corresponding to mouth movements of the audio sequence. In an example, each audio sequence in the audio sequences is represented by a 2048-dimensional vector and each sequence in the audio sequences is for a duration of time of 20 ms. In the example, there may be 10 audio sequences in the audio sequences giving the audio sequences a total duration of 200 ms. Each audio sequence may be represented in 16-bit audio and may be sampled at 16 kHz. In the example, the features from the neutral face may be 27-dimensional coefficients. The features from the neutral face may be represented by an all zero vector. In the example, the outputs of the generator 502 are 27-dimensional coefficients corresponding to mouth movements of the audio sequence.

In general, the discriminator 510 is configured to classify a pairing of a portion of an audio sequence (a) and mouth/lip facial features (e). The discriminator 510 may be comprised by LSTM units (not shown). Output of the discriminator 510 is expressed as a conditional Wasserstein distance loss. With more specificity, the discriminator 510 computes a Wasserstein distance for pairs of audio sequences and (real) facial features, pairs of audio sequences and (fake) facial features generated by the generator 502, and pairs of mismatched audio sequences and real facial features. In an example, the discriminator 510 may have a first layer, a second layer, and a third layer. The first layer may comprise 128 hidden units (neurons). The second layer may comprise 64 hidden units (neurons). The third layer may comprise 1 hidden unit in order to classify between real and fake facial features.

Figure 6:
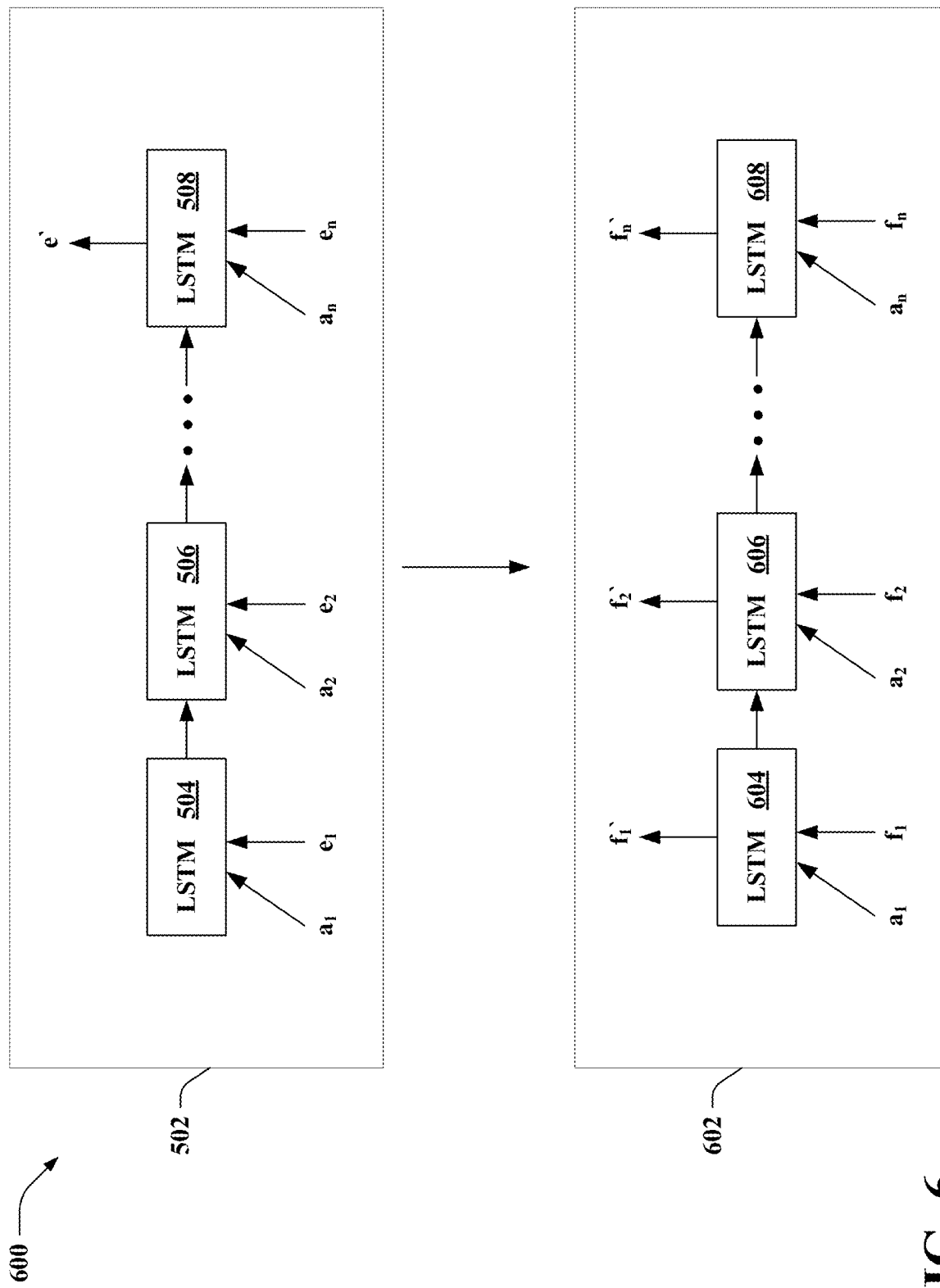
FIG. 6 is a depiction of different exemplary generators in a GAN.

Turning now to FIG. 6, a depiction 600 of two exemplary generators that may be part of a GAN is illustrated. The depiction 600 includes the generator 502 described above in the description of FIG. 5 and a sequence generator 602. In an example, the sequence generator 602 can be or include the machine learning model 118, the machine learning model 220, the machine learning model 242, and/or the machine learning model 412. In another example, the machine learning model 118, the machine learning model 220, the machine learning model 242, and/or the machine learning model 412 can be or include the sequence generator 602. The sequence generator 602 comprises a plurality of long short-term memory (LSTM) units 604-608. The inputs to the sequence generator 602 are the audio sequences ($a_1 \ldots a_n$) having a duration of time (described above), features from a neutral face in addition to the features output by the generator 502 (collectively, $f_1 \ldots f_n$) described above, and random gaussian noise vectors (not shown). The outputs of the sequence generator 602 are facial features ($f_1' \ldots f_2'$) corresponding to mouth movements of the audio sequences, as well as other facial features (e.g., nose, eyes, etc.). In an example, the features from the neutral face may be 19-dimensional coefficients and the features output by the generator 502 may be 27-dimensional coefficients. In the example, the outputs of the sequence generator 602 may be 46-dimensional coefficients corresponding movement of full facial features.

Figure 7:
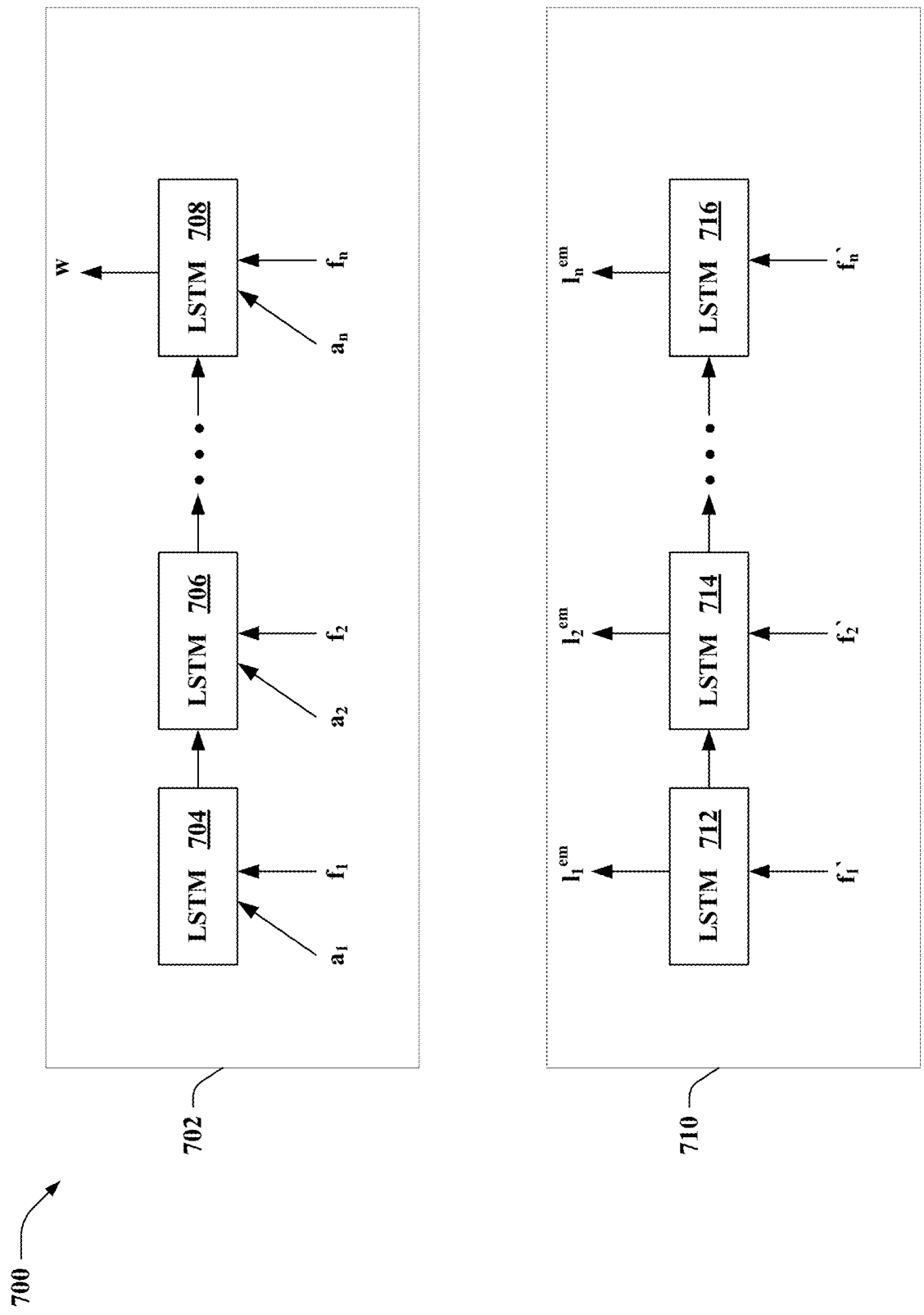
FIG. 7 is a depiction of different exemplary discriminators in a GAN.

Referring now to FIG. 7, a depiction 700 of two exemplary discriminators that may be part of a GAN is illustrated. The depiction 700 includes a sequence discriminator 702 and a mood discriminator 710. The sequence discriminator 702 comprises a plurality of LSTM units 704-708. In an example, the sequence discriminator 702 can be or include the machine learning model 118, the machine learning model 220, the machine learning model 242, and/or the machine learning model 412. In another example, the machine learning model 118, the machine learning model 220, the machine learning model 242, and/or the machine learning model 412 can be or include the sequence discriminator 702. In general, the sequence discriminator 702 is configured to classify a pairing of an audio sequence (a) in the audio sequences ($a_1 \ldots a_n$) and a facial feature (f) in the full facial features ($f_1 \ldots f_n$). Output of the sequence discriminator 702 may be expressed as a conditional Wasserstein distance loss. With more specificity, the sequence discriminator 702 computes a Wasserstein distance for pairs of audio sequences and (real) full facial features, pairs of audio sequences and (fake) full facial features generated by the sequence generator 602, and pairs of mismatched audio sequences and real full facial features. The sequence discriminator 702 serves to improve correlation of the audio sequences and the full facial features. The sequence discriminator 702 additionally reduces local variance and improves consistency in representation of the full facial features over the audio sequences.

In an example, the mood discriminator 710 can be or include the machine learning model 118, the machine learning model 220, the machine learning model 242, and/or the machine learning model 412. In another example, the machine learning model 118, the machine learning model 220, the machine learning model 242, and/or the machine learning model 412 can be or include the mood discriminator 710. The mood discriminator 710 may be an n+1 mood/emotion classifier for n moods/emotions and 1 fake category. In an example, n=6 and the moods/emotions are happy, sad, angry, disgust, fearful, and neutral. The mood discriminator 710 comprises a plurality of LSTM units 712-716. The mood discriminator 710 takes a sequence of real facial features or a sequence of (fake) facial features $f_1' \ldots f_n'$ generated by the sequence generator 602 as input. The mood discriminator 710 attempts to classify real facial features according to a label (happy, sad, angry, disgust, fearful, or neutral) and fake facial features as fake. The sequence generator 602 attempts to force the mood discriminator 710 to classify both the real and fake facial features as real, while the mood discriminator 710 attempts to classify the real and fake facial features properly. Thus, the sequence generator 602 and the mood discriminator 710 tend to ensure that sequences of facial features reflect the (overall) mood of the audio sequence. After processing the input sequence of facial features via the plurality of LSTM units 712-716, the mood discriminator 710 classifies each frame of the sequence of facial features as per the emotion label of the sequence to ensure that each frame of the visual representation of the face reflects the emotion/mood of the audio sequence.

In an embodiment, output of the sequence generator 602 may be penalized with supervised mean squared loss to establish a balance between content and mood/emotion synchronization. Overall loss for the sequence generator 602 is the combined loss containing the mean-squared error loss (MSE) and discriminator loss from the sequence discriminator 702 and the mood discriminator 710.

Figure 8:
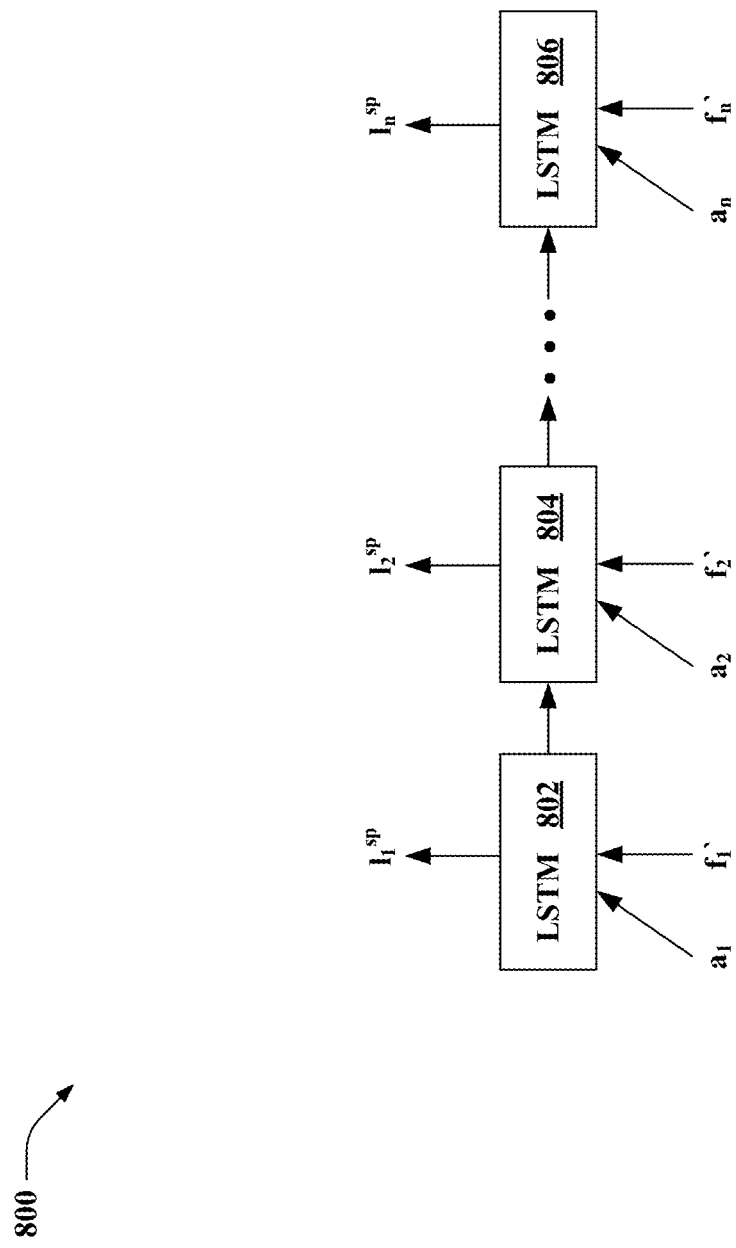
FIG. 8 is a depiction of an exemplary discriminator in a GAN.

With reference now to FIG. 8, an exemplary identity discriminator 800 is depicted. The identity discriminator 800 comprises a plurality of LSTM units 802-806. In an example, the identity discriminator 800 can be or include the machine learning model 118, the machine learning model 220, the machine learning model 242, and/or the machine learning model 412. In another example, the machine learning model 118, the machine learning model 220, the machine learning model 242, and/or the machine learning model 412 can be or include the identity discriminator 800.

The identity discriminator 800 is configured to classify pairings of audio sequences and facial features, wherein the facial features vary due to differing genders, ages, and ethnicities of speakers of the audio sequences. As such, the identity discriminator 800 takes the audio sequences $(a_1 \ldots a_n)$ having a duration of time (described above) and facial features $(f_1' \ldots f_2')$ corresponding to mouth movements of the audio sequences and other facial features (e.g., nose, eyes, etc.) as input. With more specificity, the identity discriminator 800 attempts to classify pairs of real audio sequences and real facial features, pairs of real audio sequences and (fake) facial features generated by the sequence generator 602, and mismatched audio sequences and real facial features. The identity discriminator 800 attempts to classify the pairs of real audio sequences and the real facial features to the correct speaker. The identity discriminator 800 also attempts to classify the pairs of real audio sequences and the fake facial features generated by the sequence generator 602 as fake. The identity discriminator 800 further attempts to classify the mismatched audio sequences and the real facial features as fake. The identity discriminator 800 may be an n+1 identity classifier for n speakers and 1 fake category. In an example, n=50 such that the identity discriminator 800 is a 50+1 way classifier corresponding to 50 speakers and 1 fake speaker. Loss from the identity discriminator 800 may be added to loss for the sequence generator 602.

In an embodiment, training of the identity discriminator 800 may be improved by grouping audio sequences of speakers according to gender, age, and/or ethnicity in order to define a multi-label classification task.

The generators and discriminators described above in the description of FIGS. 5-8 enable moods/emotions of a speaker to be treated more explicitly than conventional approaches that introduce implicit emotional/mood awareness across different spoken words. By introducing emotion/mood as another degree of freedom, the generators and discriminators described above help to alleviate the averaging effect which occurs due to multi-modal nature of distributions. The introduction of adversarial loss of a GAN helps to learn mood/emotions features in a semi-supervised manner. The GAN also achieves a balance between properly animating the mouth/lips of the visual representation while still properly animating other facial features of the visual representation to depict a style of the speaker.

In accordance with the methods and systems described herein, a variational autoencoder (VAE) model is now derived for purposes of explanation. The VAE model can be or include the machine learning model 118, the machine learning model 220, the machine learning model 242, and/or the machine learning model 412. The machine learning model 118, the machine learning model 220, the machine learning model 242, and/or the machine learning model 412 may also be or include the VAE model. Let $D=\{X^i\}_{i=1}^{M}$ consist of M independent and identically distributed sequences (i.i.d.) sequences. Every $X^i=\{x^{(i,n)}\}_{n=1}^{N^i}$ is a sequence of $N^i$ observed variables, where $N^i$ refers to the number of content segments in the $i^{th}$ sequence and $x^{(i,n)}$ refers to the $n^{th}$ (audio) content segment in the $i^{th}$ (audio) sequence. The term "i" is omitted in subsequent notations to refer to terms associated with a single sequence without a loss in generality.

Let each sequence X be generated randomly from a prior distribution $p_\theta(\mu)$, N i.i.d. latent style variables $$Z_s = \{z_s^n\}_{n=1}^{N}$$

drawn from a sequence-dependent prior distribution $p_\theta(z_s|\mu)$, and N i.i.d. latent content variables $$Z_c = \{z_c^n\}_{n=1}^{N}$$

drawn from a sequence independent prior distribution $p_\theta(z_c)$. The sequence therefore comprises N i.i.d. latent variables $$\{x^n\}_{n=1}^{N}$$

drawn from a conditional distribution $p_\theta(x|z_c, z_s)$. A joint probability for the sequence is given by equation (1):

$$p_\theta(X, Z_c, Z_s, \mu) = p_\theta(\mu)\prod_{n=1}^{N} p_\theta(x^n \mid z_c^n, z_s^n) \qquad (1)$$

$$p_\theta(z_c^n)p_\theta(z_s^n \mid \mu)$$

where, $$p_\theta(x^n \mid z_c^n, z_s^n) = \mathcal{N}\left(x \mid f_{\mu_x}(z_c, z_s), \operatorname{diag}(f_{\sigma_x^2}(z_c, z_s))\right)$$

$$p_\theta(z_c) = \mathcal{N}(z_c \mid 0, \sigma_{z_c}^2 I)$$

$$p_\theta(z_s \mid \mu) = \mathcal{N}(z_s \mid \mu, \sigma_{z_s}^2 I)$$

$$p_\theta(\mu) = \mathcal{N}(\mu \mid 0, \sigma_\mu^2 I)$$

A prior over $\mu$ and latent content variables $z_c$ are centered isotropic multivariate Gaussian distributions, while a prior over latent style variables $z_s$ conditioned on $\mu$ is an isotropic multivariate Gaussian distribution centered at $\mu$. Functions $f(.)$ are parameterized by neural networks with $\theta$ denoting the set of parameters for a generative model. Thus, by formulating the generative model in this manner, the latent style variables $z_s$ are forced to be close to the sequence dependent prior $\mu$ as well as each other in Euclidean distance. At the same time, the latent style variables $z_s$ tend to have higher variance across sequences and lower variance within sequences. The latent content variables $z_c$ (being sequence independent) are constrained more globally (agnostic to belong to a particular sequence). Since content varies uniformly across all utterances, this allows to model variations that are indistinguishable and agnostic both within and across sequences.

Since an exact posterior interference is intractable in a VAE model, an inference model $q_\phi(Z_c^i, Z_s^i, \mu^i|X^i)$ is defined to approximate the true posterior $p_\theta(Z_c^i, Z_s^i, \mu^i|X^i)$ for variational inference according to equation (2):

$$q_\phi(Z_c^i, Z_s^i, \mu^i \mid X^i) = q_\phi(\mu^i)\prod_{n=1}^{N} p_\theta(z_c^{i,n} \mid z_s^{i,n}, x^{i,n}) \qquad (2)$$

$$q_\phi(z_s^{i,n} \mid x^{i,n})$$

where, $$q_\phi(\mu) = \mathcal{N}(\mu^i \mid g_{\mu_\mu}(i), \sigma_\mu^2 I)$$

-continued $$q_\phi(z_s \mid x) = \mathcal{N}\left(z_s \mid g_{\mu_{z_s}}(x), \text{diag}\left(g_{\sigma^2_{z_s}}((x))\right)\right)$$

$$q_\phi(z_c \mid x, z_s) = \mathcal{N}\left(z_c \mid g_{\mu_{z_c}}(x, z_s), \text{diag}\left(g_{\sigma^2_{z_c}}(x, z_s)\right)\right)$$

All posteriors are multivariate Gaussian distributions and all functions g (.) are parameterized by neural networks with ∅ denoting the set of model parameters. Notably, μ is not directly inferred from X. Rather, it is part of learnable model parameters such that for each utterance $X^i$ in a training dataset, there exists a specific value of the posterior mean μ that can be obtained $g_{\mu_\mu}(i) = \tilde{\mu}^i$.

A variational lower bound for the inference model is given according to equations (3), (4), (5), and (6):

$$\mathcal{L}(\theta, \phi; X) \geq \sum_{n=1} \mathcal{L}(\theta, \phi; x^n \mid \tilde{\mu}) + \log p_\theta(\tilde{\mu}) \quad (3)$$

$$\mathcal{L}(\theta, \phi; x^n \mid \tilde{\mu}) = \mathbb{E}_{q_\phi(z^n_c \mid z^s_s, x^n)}[\log p_\theta(x^n \mid z^n_c, z^n_s)] \quad (4)$$

$$-\mathbb{E}_{q_\phi(z^s_s \mid x^n)}[D_{KL}(q_\phi(z^n_c \mid x^n, z^n_s) \| p_\theta(z^n_c))] \quad (5)$$

$$-\beta D_{KL}(q_\phi(z^n_s \mid x^n) \| p_\theta(z^n_s \mid \tilde{\mu})) \quad (6)$$

Latent style variables model (large) global variance due to factors such as a mood/emotion of a speaker, an age of the speaker, a gender of the speaker, and/or an ethnicity of the speaker. When driving facial animation via audio, these factors are categorized as emotional variations, identity-based variations, and miscellaneous variations. In addition to hierarchical disentanglement of an audio representation, the VAE model can be further improved by enforcing disentanglement of the audio representation at a global (sequence) level among the major sources of variations. As specific parts of the latent representation focus on a particular attribute, the VAE model is less complex and more compact while achieving generalization. To promote lateral disentanglement at the style (sequence) level, a factor β≥1 (see equation 6) is introduced to penalize the Kullback-Leibler (KL)-divergence from the latent style variable $z_s$. Thus, the β factor acts as a regularizer over the posterior distribution. The β factor enforces a stronger constraint over the posterior distribution to match an isotropic Gaussian distribution, thus allowing different dimensions of the posterior distribution to be independent of each other and hence disentangled.

As an approximate posterior of μ does not depend on a sequence X, a sequence (style) variational lower bound $\mathcal{L}(\theta, \emptyset; X)$ can be decomposed into a sum of conditional segment (content) variational lower bounds over segments, $\mathcal{L}(\theta, \emptyset; x^n \mid \tilde{\mu})$. Therefore, a batch may be sampled at a segment (content) level to maximize the segment (content) variational lower bound according to equation (7):

$$\mathcal{L}(\theta, \phi; x^n) = \mathcal{L}(\theta, \phi; x^n \mid \tilde{\mu}) + \frac{1}{N} \log p_\theta(\tilde{\mu}) + const \quad (7)$$

This provides better scalability for long sequences when it becomes computationally expensive to perform a batch update for an entire sequence.

An objective of the VAE model is to encode different types of information into separate latent variables by having sequence-dependent and sequence-independent priors. However, if the prior μ becomes 0, trivial solutions hindering disentanglement will be provided. Therefore, to encourage disentanglement and to allow $z_s$ to encode style-based global attributes, specific parts of $z_s^{i,n}$ (inferred from $x^{i,n}$) are used to used to separately infer labels corresponding to the mood/emotion of a speaker, an identity of the speaker, and a sequence index.

Accordingly, let $z_s^{i,n} = \{em_{z_s}, id_{z_s}, misc_{z_s}\}^{i,n}$, where $em_{z_s}$, $id_{z_s}$, and $misc_{z_s}$ encode mood/emotion-based, identity-based, and miscellaneous attributes, respectively, at the sequence level. Let $\mathbb{E}$ be a set of all emotion labels and $e^{i,n} \in \mathbb{E}$ be an emotion label corresponding to $z_s^{i,n}$. An emotion-based discriminative objective is given in equation (8):

$$\mathcal{L}^{em}(e^{i,n}, em_s^{i,n}) = \log p(e^{i,n} \mid em_s^{i,n}) \quad (8)$$

$$= \log p(em_s^{i,n} \mid e^{i,n}) - \log \sum\nolimits_{e_k}^{\mathbb{E}} p(em_s^{i,n} \mid e_k)$$

Similarly, let $\mathbb{ID}$ be a set of all emotion labels and $id^{i,n} \in \mathbb{ID}$ be an emotion label corresponding to $z_s^{i,n}$. An identity-based discriminative objective is given in equation (9):

$$\mathcal{L}^{id}(id^{i,n}, id_s^{i,n}) = \log p(id^{i,n} \mid id_s^{i,n}) \quad (9)$$

$$= \log p(id_s^{i,n} \mid id^{i,n}) - \log \sum\nolimits_{id_k}^{\mathbb{ID}} p(id_s^{i,n} \mid id_k)$$

Likewise, to allow the entire $z_s^{i,n}$ to correspond to a sequence-level attribute, a sequence discriminative objective over $z_s^{i,n}$ to infer the sequence index i of $x^{i,n}$ is given in equation (10):

$$\mathcal{L}^{seq}(i, z_s^{i,n}) = \log p(i \mid z_s^{i,n}) \quad (10)$$

$$= \log p(z_s^{i,n} \mid i) - \log \sum_{j=0}^{M} p(z_s^{i,n} \mid j)$$

$$= \log p_\theta(z_s^{i,n} \mid \tilde{\mu}^i) - \log \sum_{j=0}^{M} p_\theta(z_s^{i,n} \mid \tilde{\mu}^j)$$

Combining the various discriminative objective with the segment (content) variational lower bound, the objective function to maximize is given in equation (11):

$$\mathcal{L}^{dis}(\theta, \phi; x^{i,n}) = \quad (11)$$

$$\mathcal{L}(\theta, \phi; x^{i,n}) + \alpha(\mathcal{L}^{em}(e^{i,n}, em_s^{i,n}) + \mathcal{L}^{id}(id^{i,n}, id_s^{i,n}) + \mathcal{L}^{seq}(i, z_s^{i,n})$$

Figure 9:
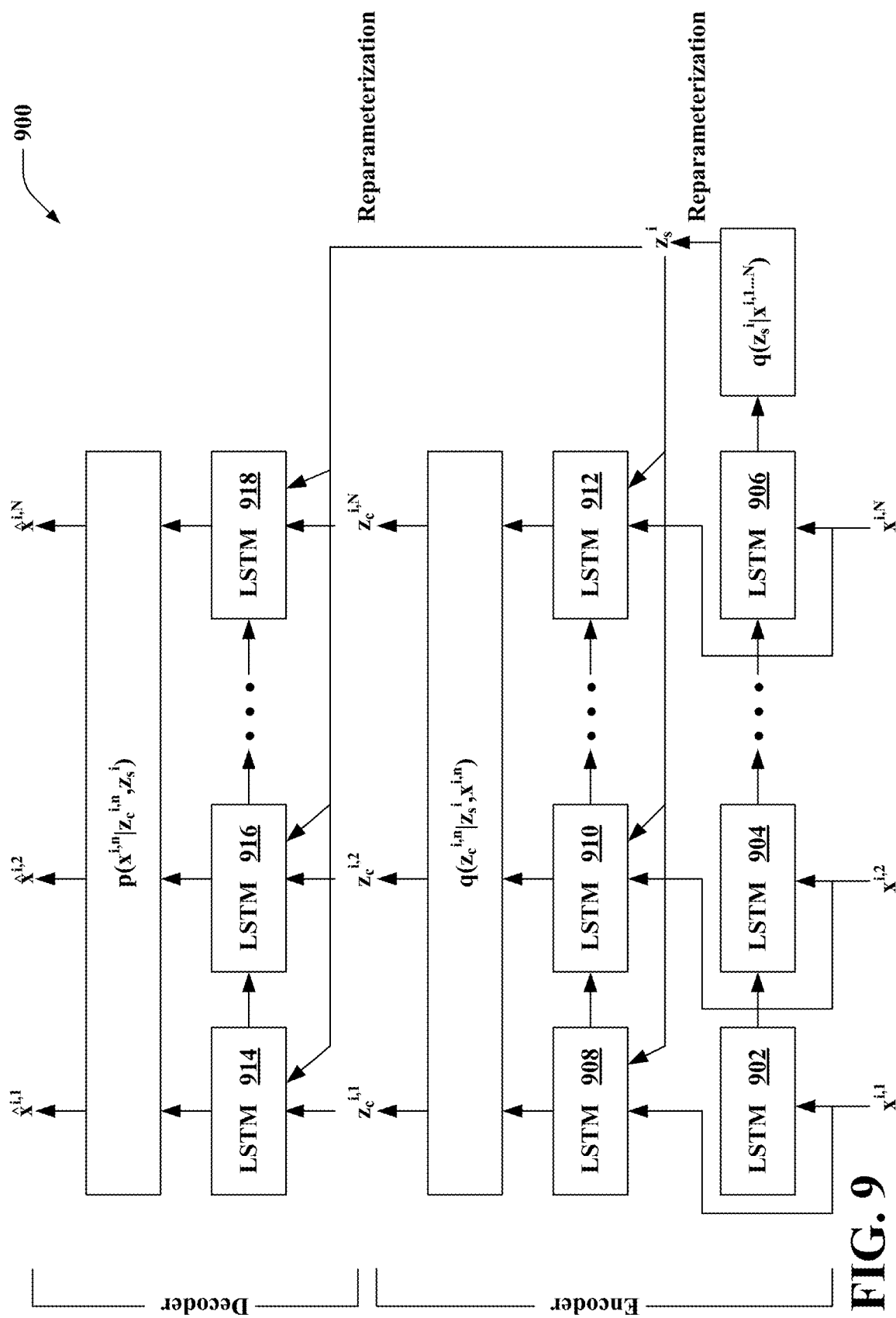
FIG. 9 is a depiction of an exemplary Variational Autoencoder (VAE).

Turning now to FIG. 9 an exemplary variational autoencoder (VAE) 900 is depicted. The VAE 900 may be representative of the VAE model derived above in equations 1-11 and their accompanying explanation. Moreover, the VAE 900 can be used to learn an unsupervised disentangled hierarchical representation from an audio sequence. In an example, the VAE 900 can be or include the machine learning model 118, the machine learning model 220, the machine learning model 242, and/or the machine learning model 412. In another example, the machine learning model 118, the machine learning model 220, the machine learning model 242, and/or the machine learning model 412 can be or include the VAE 900.

The VAE 900 comprises an encoder and a decoder. The encoder comprises a first plurality of LSTM units 902-906 and a second plurality of LSTM units 908-912. The first plurality of LSTM units 902-906 takes audio sequences $x^{i,1} \ldots x^{i,N}$ as input and generate latent style variables $z_s^i$ as output conditioned on the audio sequences (i.e., $q(z_s^i|x^{i,1\ldots N})$) The latent style variables are then reparameterized. The second plurality of LSTM units 908-912 takes the audio sequences $x^{i,1} \ldots x^{i,N}$ and the latent style variables $z_s^i$ as input. The second plurality of LSTM units 908-912 outputs latent content variables $z_c^i$ conditioned upon the latent style variables $z_s^i$ and the audio sequences $x^{i,1} \ldots x^{i,N}$ (i.e., $q(z_c^{i,n}|z_s^i,x^{i,n})$). The latent content variables are then reparameterized.

The decoder comprises a third plurality of LSTM units 914-918. The third plurality of LSTM units 914-918 takes the latent content variables $z_c^i$ and the latent style variables $z_s^i$ as input and outputs a reconstructed audio sequence $\hat{x}^{i,1} \ldots \hat{x}^{i,N}$ conditioned upon the latent content variables and the latent style variables (i.e. $p(x^{i,n}|z_c^{i,n},z_s^i)$).

Figure 10:
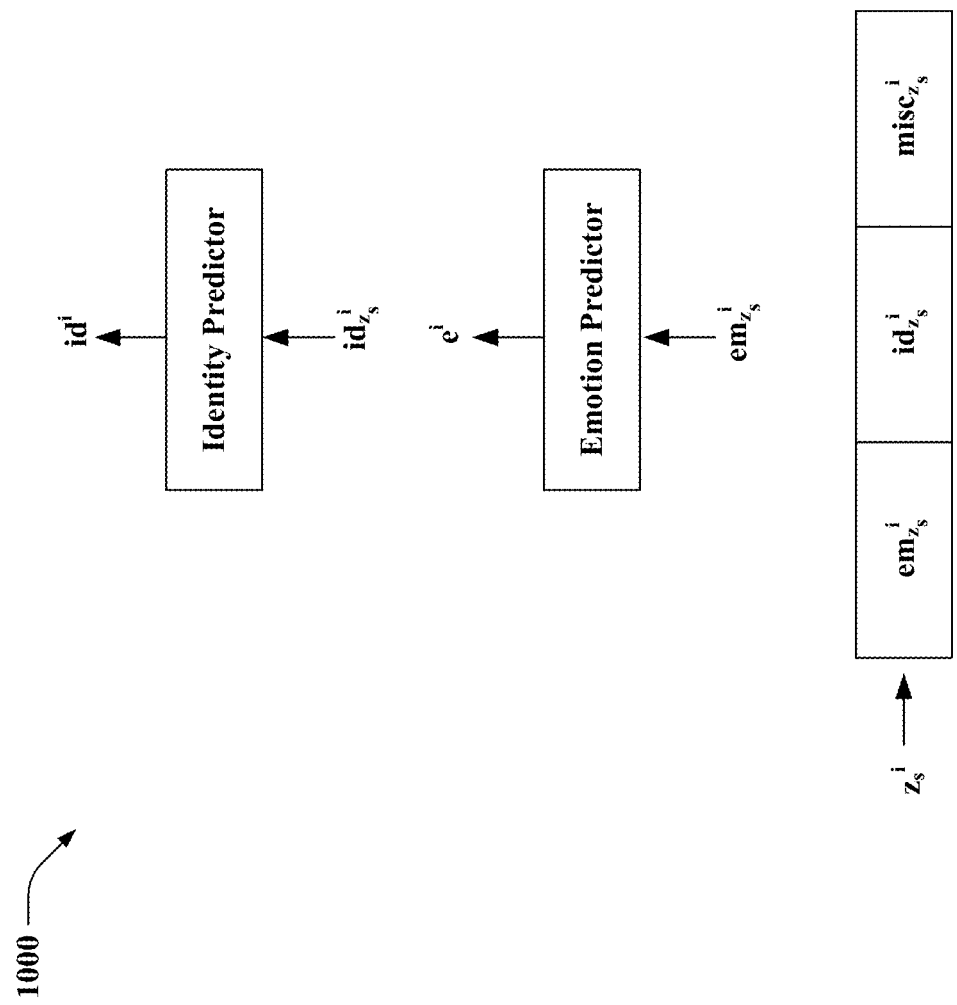
FIG. 10 is a depiction of lateral disentanglement of latent style variables.

Referring now to FIG. 10, a depiction 1000 of lateral disentanglement of latent style variables is illustrated. Through use of the above-described processes, latent style variables $z_s^i$ are laterally disentangled into three different components: a mood/emotion component $em_{z_s}^i$, an identity component $id_{z_s}^i$, and a miscellaneous component $misc_{z_s}^i$. Supervised predictor models (i.e., an emotion predictor and an identity predictor) may utilize the mood/emotion component $em_{z_s}^i$ and the identity component $id_{z_s}^i$ to compute a mood/emotion-based discriminative objective and an identity-based discriminative objective by predicting mood/emotion and identity of a speaker of an audio sequence.

Figure 11:
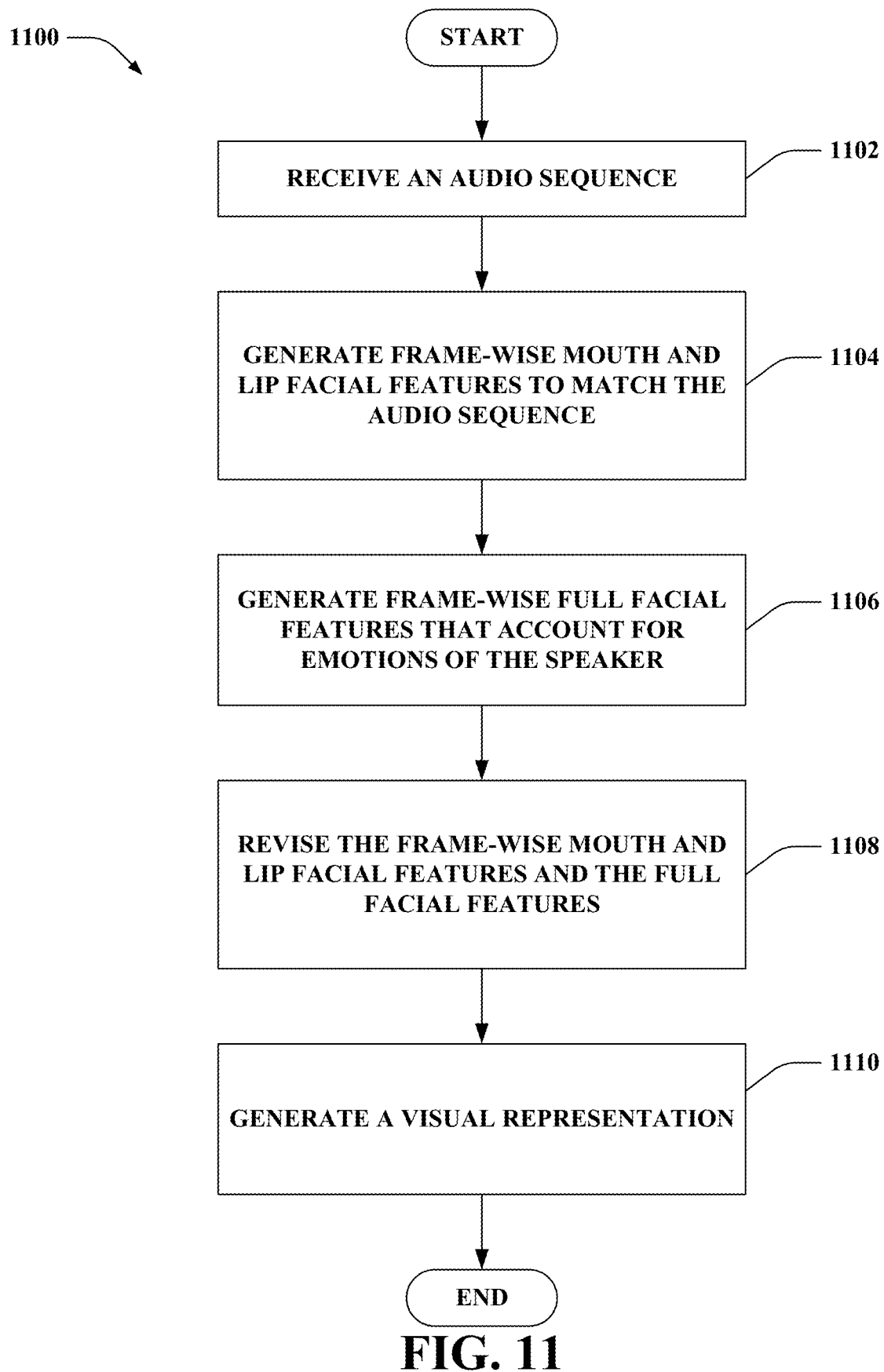
FIG. 11 is a flow diagram that illustrates an exemplary methodology for animating a visual representation of a face.
Figure 12:
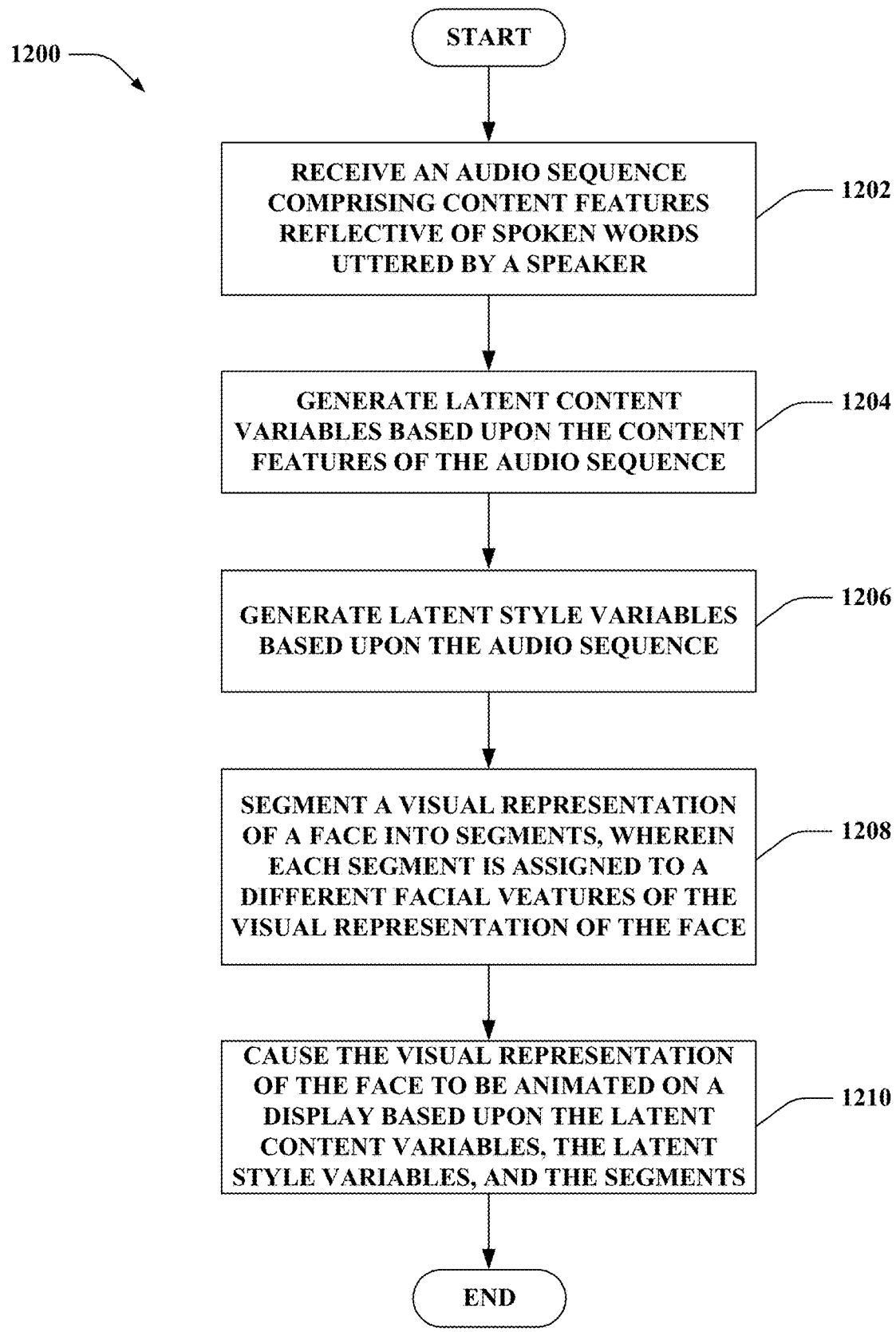
FIG. 12 is a flow diagram that illustrates another exemplary methodology for animating a visual representation of a face.

FIGS. 11 and 12 illustrate exemplary methodologies relating to animating a visual representation of a face based upon an audio sequence uttered by a speaker. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Turning now to FIG. 11, a methodology 1100 executed by a computing device for animating a visual representation of a face is illustrated. At 1102, the computing device receives an audio sequence uttered by a speaker. At 1104, the computing device generates frame-wise mouth and lip facial features of the visual representation to match the audio sequence. At 1106, the computing device generates frame-wise full facial features of the visual representation that account for emotions/moods of the speaker. At 1108, the computing device revises the frame-wise mouth and lip facial features as well as the frame-wise full facial features. At 1110, the computing device animates the visual representation of the face in accordance with the frame-wise mouth and lip features and the frame-wise full facial features.

With reference to FIG. 12, a methodology 1200 executed by a computing device for animating a visual representation of a face is illustrated. At 1202, the computing device receives an audio sequence. The audio sequence comprises content features reflective of spoken words uttered by a speaker.

At 1204, the computing device generates latent content variables based upon the content features of the audio sequence. The latent content variables are to be used to synchronize movement of lips on the visual representation of the face to the spoken words uttered by the speaker. At 1206, the computing device generates latent style variables based upon the audio sequence. The latent style variables are derived from an expected appearance of facial features of the speaker as the speaker utters the spoken words. The latent style variables are to be used to synchronize movement of full facial features of the visual representation of the face to the spoken words uttered by the speaker.

At 1208, the computing device segments the visual representation of the face into segments. Each segment in the segments is assigned to a different facial feature of the visual representation of the face. At 1210, the computing device causes the visual representation of the face to be animated on a display based upon the latent content variables, the latent style variables, and the segments.

Figure 13:
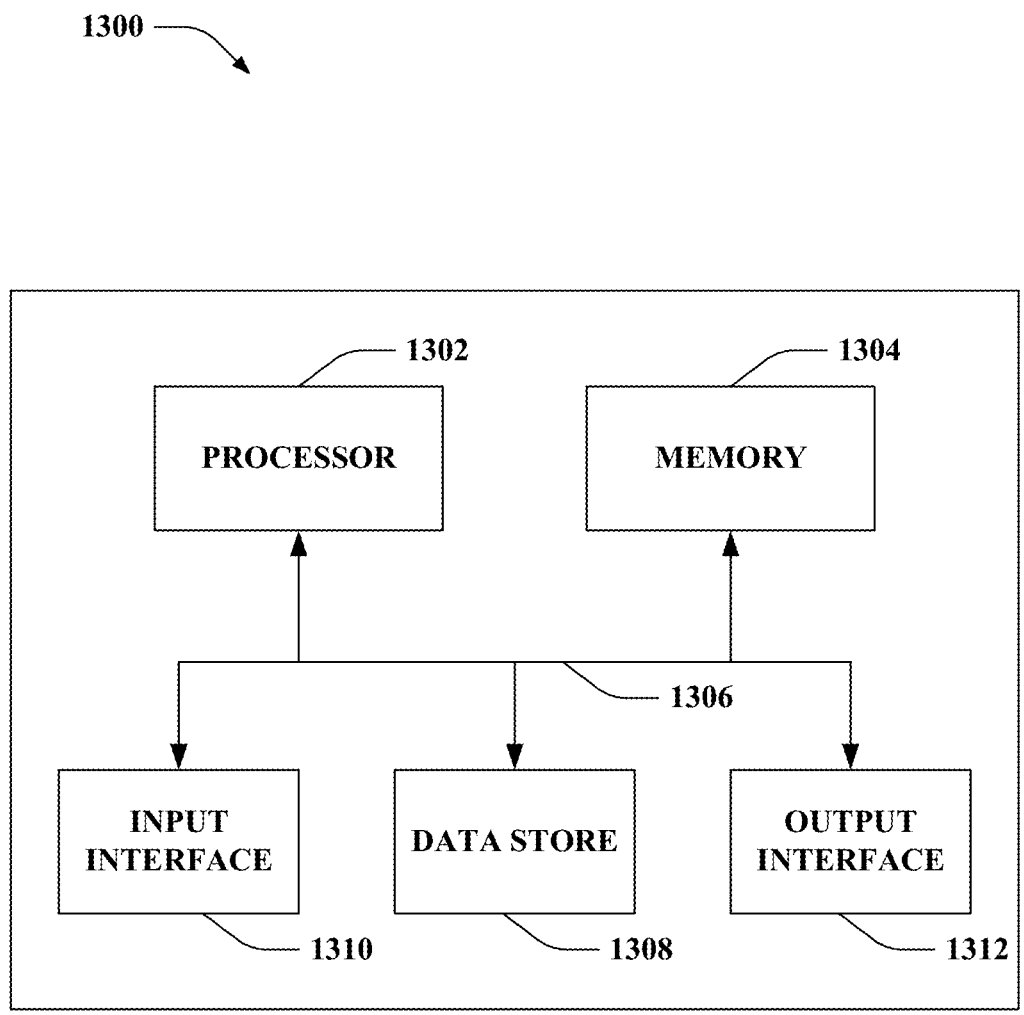
FIG. 13 illustrates an exemplary computing device.

Referring now to FIG. 13, a high-level illustration of an exemplary computing device 1300 that can be used in accordance with the systems and methodologies disclosed herein is illustrated. For instance, the computing device 1300 may be used in a system that animates a visual representation of a face based upon an audio sequence uttered by a speaker. By way of another example, the computing device 1300 can be used in a system that trains a computer-implemented machine learning model that is to be utilized in animating a visual representation of a face. The computing device 1300 includes at least one processor 1302 that executes instructions that are stored in a memory 1304. The at least one processor may be a central processing unit (CPU), a graphics processing unit (GPU), etc. The instructions may be, for instance, instructions for implementing functionality described as being carried out by one or more components discussed above or instructions for implementing one or more of the methods described above. The processor 1302 may access the memory 1304 by way of a system bus 1306. In addition to storing executable instructions, the memory 1304 may also store computer-implemented machine learning models, audio sequences, videos, avatars, and so forth.

The computing device 1300 additionally includes a data store 1308 that is accessible by the processor 1302 by way of the system bus 1306. The data store 1308 may include executable instructions, computer-implemented machine learning models, audio sequences, videos, avatars, etc. The computing device 1300 also includes an input interface 1310 that allows external devices to communicate with the computing device 1300. For instance, the input interface 1310 may be used to receive instructions from an external computer device, from a user, etc. The computing device 1300 also includes an output interface 1312 that interfaces the computing device 1300 with one or more external devices. For example, the computing device 1300 may display text, images, etc. by way of the output interface 1312.

It is contemplated that the external devices that communicate with the computing device 1300 via the input interface 1310 and the output interface 1312 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1300 in a manner free from constraints imposed by input devices such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1300 may be a distributed system. Thus, for instance, several devices may be in communication by way of a network connection and may collectively perform tasks described as being performed by the computing device 1300.

Figure 14:
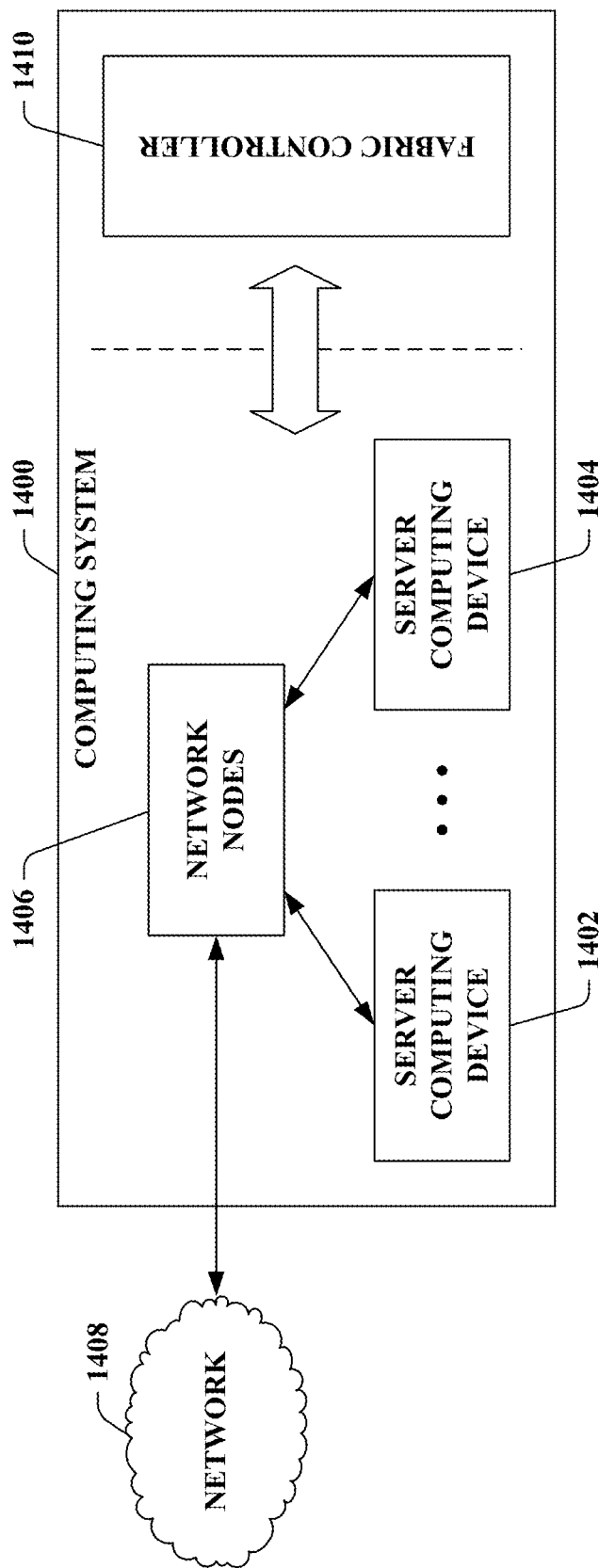
FIG. 14 illustrates an exemplary computing system.

Turning to FIG. 14, a high-level illustration of an exemplary computing system 1400 that can be used in accordance with the systems and methodologies disclosed herein is illustrated. For instance, the computing system 1400 can be or include the computing system 200, the computing system 300, the computing system 400, etc. Additionally or alternatively, the computing system 200, the computing system 300, and/or the computing system 400 can be or include the computing system 1400.

The computing system 1400 includes a plurality of server computing devices, namely, a server computing device 1402, . . . , and a server computing device 1404 (collectively referred to as server computing devices 1402-1404). The server computing device 1402 includes at least one processor and a memory; the at least one processor executes instructions that are stored in the memory. The instructions may be, for instance, instructions for implementing functionality described as being carried out by one or more components discussed above or instructions for implementing one or more of the methods described above. Similar to the server computing device 1402, at least a subset of the server computing devices 1402-1404 other than the server computing device 1402 each respectively include at least one processor and a memory. Moreover, at least a subset of the server computing devices 1402-1404 include respective data stores.

Processor(s) of one or more of the server computing devices 1402-1404 can be or include the processor 102, the processor 204, the processor 226, and/or the processor 404. Further, a memory (or memories) of one or more of the server computing devices 1402-1404 can be or include the memory 104, the memory 206, the memory 228, and/or the memory 406. Moreover, a data store (or data stores) of one or more of the server computing devices 1402-1404 can be or include the data store 116, the data store 218, the data store 240, and/or the data store 410.

The computing system 1400 further includes various network nodes 1406 that transport data between the server computing devices 1402-1404. Moreover, the network nodes 1402 transport data from the server computing devices 1402-1404 to external nodes (e.g., external to the computing system 1400) by way of a network 1408. The network nodes 1406 also transport data to the server computing devices 1402-1404 from the external nodes by way of the network 1408. The network 1408, for example, can be the Internet, a cellular network, or the like. The network nodes 1406 include switches, routers, load balancers, and so forth.

A fabric controller 1410 of the computing system 1400 manages hardware resources of the server computing devices 1402-1404 (e.g., processors, memories, data stores, etc. of the server computing devices 1402-1404). The fabric controller 1410 further manages the network nodes 1406. Moreover, the fabric controller 1410 manages creation, provisioning, de-provisioning, and supervising of virtual machines instantiated upon the server computing devices 1402-1404.

Various examples are now set forth.

Example 1: A computing device comprising: a processor; memory storing instructions, wherein the instructions, when executed by the processor, cause the processor to perform acts comprising: receiving an audio sequence comprising content features reflective of spoken words uttered by a speaker; generating latent content variables based upon the content features of the audio sequence, wherein the latent content variables are to be used to synchronize movement of lips on a visual representation of a face to the spoken words uttered by the speaker; generating latent style variables based upon the audio sequence, wherein the latent style variables are derived from an expected appearance of facial features of the speaker as the speaker utters the spoken words, wherein the latent style variables are to be used to synchronize movement of full facial features of the visual representation of the face to the spoken words uttered by the speaker; and causing the visual representation of the face to be animated on a display based upon the latent content variables and the latent style variables.

Example 2: The computing device according to Example 1, wherein the computing device is a gaming console.

Example 3: The computing device according to any of Examples 1-2, wherein the computing device receives the audio sequence by way of a microphone.

Example 4: The computing device according to any of Examples 1-3, wherein the latent style variables are influenced by at least one of an age of the speaker, a gender of the speaker, an ethnicity of the speaker, or one or more emotions of the speaker as the speaker utters the spoken words.

Example 5: The computing device according to any of Examples 1-4, wherein the computing device is in network communication with a second computing device, wherein the second computing device comprises a microphone and the display, wherein the second computing devices receives the audio sequence from the speaker by way of the microphone, wherein the second computing device transmits the audio sequence to the computing device, wherein the computing device transmits data to the second computing device causing the second computing device to animate the visual representation of the face on the display.

Example 6: The computing device according to any of Examples 1-5, the acts further comprising: subsequent to generating the latent style variables and prior to causing the visual representation of the face to be animated, segmenting the visual representation of the face into segments, wherein each segment in the segments is assigned to a different facial feature of the visual representation of the face, wherein causing the visual representation of the face to be animated on the display is further based upon the segments.

Example 7: The computing device according to Example 6, wherein the segments comprise: a first segment assigned to eyes of the visual representation; a second segment assigned to a nose of the visual representation; a third segment assigned to a mouth of the visual representation; and a fourth segment assigned to features of the visual representation other than the eyes, the nose, and the mouth.

Example 8: The computing device according to any of Examples 1-7, wherein the latent content variables and the latent style variables are generated by a recurrent neural network (RNN) comprising a plurality of long short-term memory (LSTM) units.

Example 9: The computing device according to any of Examples 1-8, wherein the visual representation of the face is a depiction of a face of the speaker.

Example 10: The computing device according to any of Examples 1-9, wherein causing the visual representation of the face to be animated on the display based upon the latent content variables and the latent style variables comprises: generating a plurality of frames, wherein each frame depicts a state of the visual representation of the face at a sequential point in time; and causing each frame in the plurality of frames to be presented sequentially on the display.

Example 11: The computing device according to any of Examples 1-10, the acts further comprising: causing the audio sequence to be played on an audio speaker concurrently with causing the visual representation of the face to be animated such that movements of the visual representation of the face are synchronized with the spoken words of the audio sequence.

Example 12: A method executed by a processor of a computing device, the method comprising: receiving an audio sequence comprising content features reflective of spoken words uttered by a speaker; generating latent content variables based upon the content features of the audio sequence, wherein the latent content variables are to be used to synchronize movement of lips on a visual representation of a face to the spoken words uttered by the speaker; generating latent style variables based upon the audio sequence, wherein the latent style variables are derived from an expected appearance of facial features of the speaker as the speaker utters the spoken words, wherein the latent style variables are to be used to synchronize movement of full facial features of the visual representation of the face to the spoken words uttered by the speaker; segmenting the visual representation of the face into segments, wherein each segment in the segments is assigned to a different facial feature of the visual representation of the face; and causing the visual representation of the face to be animated on a display based upon the latent content variables, the latent style variables, and the segments.

Example 13: The method according to Example 12, wherein the visual representation of the face is an avatar of the speaker.

Example 14: The method according to any of Examples 12-13, wherein the latent style variables are influenced by at least one of an age of the speaker, a gender of the speaker, an ethnicity of the speaker, or one or more emotions of the speaker as the speaker utters the spoken words.

Example 15: The method according to any of Examples 12-14, wherein the segments comprise: a first segment assigned to eyes of the visual representation; a second segment assigned to a nose of the visual representation; a third segment assigned to a mouth of the visual representation; and a fourth segment assigned to features of the visual representation other than the eyes, the nose, and the mouth.

Example 16: The method according to any of Examples 12-15 further comprising: causing the audio sequence to be played on a speaker concurrently with causing the visual representation of the face to be animated such that movements of the visual representation of the face are synchronized with the spoken words of the audio sequence.

Example 17: A computer-readable storage medium comprising instructions that, when executed one or more processors of a computing device, perform acts comprising: receiving an audio sequence comprising content features reflective of spoken words uttered by a speaker by way of a microphone; generating latent content variables based upon the content features of the audio sequence, wherein the latent content variables are to be used to synchronize movement of lips on a visual representation of a face to the spoken words uttered by the speaker; generating latent style variables based upon the audio sequence, wherein the latent style variables are derived from an expected appearance of facial features of the speaker as the speaker utters the spoken words, wherein the latent style variables are to be used to synchronize movement of full facial features of the visual representation of the face to the spoken words uttered by the speaker; causing the visual representation of the face to be animated on a display of a second computing device that is in network communication with the computing device based upon the latent content variables and the latent style variables; and causing the audio sequence to be played on a speaker of the second computing device concurrently with causing the visual representation of the face to be animated such that movements of the visual representation of the face are synchronized with the spoken words of the audio sequence.

Example 18: The computer-readable storage medium according to Example 17, wherein the microphone is comprised by a third computing device operated by the speaker, wherein the third computing device is in network communication with the computing device, wherein the audio sequence is received from the third computing device.

Example 19: The computer-readable storage medium according to any of Examples 17-18, wherein the latent style variables are influenced by at least one of an age of the speaker, a gender of the speaker, an ethnicity of the speaker, or one or more emotions of the speaker as the speaker utters the spoken words.

Example 20: The computer-readable storage medium according to any of Examples 17-19, wherein the one or more processors are graphics processing units (GPUs).

As used herein, the terms "component", "system", and "application" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something."

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A computing device, comprising:
a processor;
memory storing instructions, wherein the instructions, when executed by the processor, cause the processor to perform acts comprising:
receiving an audio sequence reflective of words uttered by a speaker;
based upon the audio sequence, generating a first set of coefficients that are indicative of lips of the speaker as the speaker utters the words, wherein the first set of coefficients are generated based upon latent content variables that have been generated via a computer-implemented model, wherein the computer-implemented model has been trained without utilization of motion capture data, wherein the latent content variables are generated by the computer-implemented model without utilization of motion capture techniques;
based upon the audio sequence, generating a second set of coefficients that are indicative of facial features of the speaker other than the lips of the speaker as the speaker utters the words, wherein the second set of coefficients are generated based upon latent style variables that have been generated via the computer-implemented model, wherein the latent style variables comprise latent identity variables that are based upon identity factors of a plurality of speaker as the plurality of speakers speak and latent emotional variables that are based upon emotions of the plurality of speakers as the plurality of speakers speak, wherein the latent style variables are generated by the computer-implemented model without utilization of the motion capture techniques;
generating a third set of coefficients based upon the first set of coefficients and the second set of coefficients; and
causing a visual representation of a face to be animated on a display based upon the third set of coefficients such that movement of lips of the visual representation reflects the words uttered by the speaker while the visual representation is animated, wherein facial features of the visual representation of the face other than the lips are synced to the lips of the visual representation, and further wherein the visual representation of the face reflects an identity of the speaker and an emotion of the speaker as the speaker utters the words while the visual representation of the face is animated.

2. The computing device of claim 1, wherein the computing device is a gaming console.

3. The computing device of claim 1, wherein the computing device receives the audio sequence by way of a microphone.

4. The computing device of claim 1, wherein the latent identity variables are influenced by at least one of an age of the speaker, a gender of the speaker, or an ethnicity of the speaker.

5. The computing device of claim 1, wherein the computing device is in network communication with a second computing device, wherein the second computing device comprises a microphone and the display, wherein the second computing device receives the audio sequence from the speaker by way of the microphone, wherein the second computing device transmits the audio sequence to the computing device, wherein the computing device transmits data to the second computing device causing the second computing device to animate the visual representation of the face on the display.

6. The computing device of claim 1, the acts further comprising:
segmenting the visual representation of the face into segments, wherein each segment in the segments is assigned to a different facial feature of the visual representation of the face, wherein causing the visual representation of the face to be animated on the display is further based upon the segments.

7. The computing device of claim 6, wherein the segments comprise:
a first segment assigned to eyes of the visual representation;
a second segment assigned to a nose of the visual representation;
a third segment assigned to a mouth of the visual representation; and
a fourth segment assigned to features of the visual representation other than the eyes, the nose, and the mouth.

8. The computing device of claim 1, wherein the computer-implemented model includes a recurrent neural network (RNN) comprising a plurality of long short-term memory (LSTM) units.

9. The computing device of claim 1, wherein the visual representation of the face is a depiction of a face of the speaker.

10. The computing device of claim 1, wherein causing the visual representation of the face to be animated on the display based upon the third set of coefficients comprises:
generating a plurality of frames based upon the third set of coefficients, wherein each frame depicts a state of the visual representation of the face at a sequential point in time; and
causing each frame in the plurality of frames to be presented sequentially on the display.

11. The computing device of claim 1, the acts further comprising:
causing the audio sequence to be played on an audio speaker concurrently with causing the visual representation of the face to be animated such that movements of the visual representation of the face are synchronized with the words of the audio sequence.

12. A method executed by a processor of a computing device, the method comprising:
receiving an audio sequence reflective of words uttered by a speaker;
based upon the audio sequence, generating a first set of coefficients that are indicative of lips of the speaker as the speaker utters the words, wherein the first set of coefficients are generated based upon latent content variables that have been generated via a computer-implemented model, wherein the computer-implemented model has been trained without utilization of motion capture data, wherein the latent content variables are generated by the computer-implemented model without utilization of motion capture techniques;
based upon the audio sequence, generating a second set of coefficients that are indicative of facial features of the speaker other than the lips of the speaker as the speaker utters the words, wherein the second set of coefficients are generated based upon latent style variables that have been generated via the computer-implemented model, wherein the latent style variables comprise latent identity variables that are based upon identity factors of a plurality of speakers as the plurality of speakers speak and latent emotional variables that are based upon emotions of the plurality of speakers as the plurality of speakers speak, wherein the latent style variables are generated by the computer-implemented model without utilization of the motion capture techniques;
generating a third set of coefficients based upon the first set of coefficients and the second set of coefficients; and
causing a visual representation of a face to be animated on a display based upon the third set of coefficients such that movement of lips of the visual representation reflects the words uttered by the speaker while the visual representation is animated, wherein facial features of the visual representation of the face other than the lips are synced to the lips of the visual representation, and further wherein the visual representation of the face reflects an identity of the speaker and an emotion of the speaker as the speaker utters the words while the visual representation of the face is animated.

13. The method of claim 12, wherein the visual representation of the face is an avatar of the speaker.

14. The method of claim 12, wherein the latent identity variables are influenced by at least one of an age of the speaker, a gender of the speaker, or an ethnicity of the speaker.

15. The method of claim 12, further comprising:
segmenting the visual representation of the face into segments, wherein each segment in the segments is assigned to a different facial feature of the visual representation of the face, wherein causing the visual representation of the face to be animated on the display is further based upon the segments, wherein the segments comprise:
a first segment assigned to eyes of the visual representation;
a second segment assigned to a nose of the visual representation;
a third segment assigned to a mouth of the visual representation; and
a fourth segment assigned to features of the visual representation other than the eyes, the nose, and the mouth.

16. The method of claim 12 further comprising:
causing the audio sequence to be played on a speaker concurrently with causing the visual representation of the face to be animated such that movements of the visual representation of the face are synchronized with the words of the audio sequence.

17. A computer-readable storage medium comprising instructions that, when executed one or more processors of a computing device, perform acts comprising:
receiving an audio sequence reflective of words uttered by a speaker by way of a microphone;
based upon the audio sequence, generating a first set of coefficients that are indicative of lips of the speaker as the speaker utters the words, wherein the first set of coefficients are generated based upon latent content variables that have been generated via a computer-implemented model, wherein the computer-implemented model has been trained without utilization of motion capture data, wherein the latent content variables are generated by the computer-implemented model without utilization of motion capture techniques;
based upon the audio sequence, generating a second set of coefficients that are indicative of facial features of the speaker other than the tips of the speaker as the speaker utters the words, wherein the second set of coefficients are generated based upon latent style variables that have been generated via the computer-implemented model, wherein the latent style variables comprise latent identity variables that are based upon identity factors of a plurality of speakers as the plurality of speakers speak and latent emotional variables that are based upon emotions of the plurality of speakers as the plurality of speakers speak, wherein the latent style variables are generated by the computer-implemented model without utilization of the motion capture techniques;
generating a third set of coefficients based upon the first set of coefficients and the second set of coefficients;
causing a visual representation of a face to be animated on a display of a second computing device that is in network communication with the computing device based upon the third set of coefficients such that movement of lips of the visual representation reflects the words uttered by the speaker while the visual representation is animated, wherein facial features of the visual representation of the face other than the lips are synced to the lips of the visual representation, and further wherein the visual representation of the face reflects an identity of the speaker and an emotion of the speaker as the sneaker utters the words while the visual representation of the face is animated; and causing the audio sequence to be played on a speaker of the second computing device concurrently with causing the visual representation of the face to be animated such that movements of the visual representation of the face are synchronized with the words of the audio sequence.

18. The computer-readable storage medium of claim 17, wherein the microphone is comprised by a third computing device operated by the speaker, wherein the third computing device is in network communication with the computing device, wherein the audio sequence is received from the third computing device.

19. The computer-readable storage medium of claim 17, wherein the latent style variables are influenced by at least one of an age of the speaker, a gender of the speaker, or an ethnicity of the speaker.

20. The computer-readable storage medium of claim 17, wherein the one or more processors are graphics processing units (GPUs).

\* \* \* \* \*